United States Patent
Yeo

(10) Patent No.: US 11,238,208 B2
(45) Date of Patent: Feb. 1, 2022

(54) METHODS FOR OPTICAL PROXIMITY CORRECTION AND METHODS OF FABRICATING SEMICONDUCTOR DEVICE USING THE SAME

(71) Applicant: Samsung Electronics Co., Ltd., Suwon-si (KR)

(72) Inventor: Sang Chul Yeo, Osan-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/157,229

(22) Filed: Jan. 25, 2021

(65) Prior Publication Data
US 2021/0397080 A1    Dec. 23, 2021

(30) Foreign Application Priority Data

Jun. 17, 2020 (KR) .................. 10-2020-0073876

(51) Int. Cl.
| | | |
|---|---|---|
| *G06F 30/30* | (2020.01) | |
| *G03F 1/36* | (2012.01) | |
| *G03F 7/20* | (2006.01) | |
| *G06F 30/398* | (2020.01) | |
| *H01L 21/027* | (2006.01) | |
| *G06F 111/10* | (2020.01) | |
| *G06F 119/18* | (2020.01) | |

(52) U.S. Cl.
CPC .............. *G06F 30/398* (2020.01); *G03F 1/36* (2013.01); *G03F 7/705* (2013.01); *G03F 7/70441* (2013.01); *H01L 21/0274* (2013.01); *G06F 2111/10* (2020.01); *G06F 2119/18* (2020.01)

(58) Field of Classification Search
CPC ... G06F 30/30–398; G06F 2111/00–20; G06F 2113/00–20; G06F 2115/00–12; G06F 2117/00–12; G06F 2119/00–22; G03F 1/36; G03F 7/70441; G03F 7/705; H01L 21/0274

See application file for complete search history.

(56) References Cited

U.S. PATENT DOCUMENTS

| | | |
|---|---|---|
| 8,423,917 B2 | 4/2013 | Song et al. |
| 9,348,964 B2 | 5/2016 | Zhang et al. |
| 10,198,549 B2 | 2/2019 | Liu et al. |
| 10,534,255 B2 | 1/2020 | Quaglio et al. |
| 2018/0150578 A1 | 5/2018 | Lai et al. |

(Continued)

OTHER PUBLICATIONS

Michael C. Lam et al., "Accurate 3DEMF mask model for full-chip simulation", Optical Microlithography XXVI, edited by Will Conley, Proc. of SPIE, vol. 8683, 86831D.

*Primary Examiner* — Leigh M Garbowski
(74) *Attorney, Agent, or Firm* — Myers Bigel, P.A.

(57) ABSTRACT

A semiconductor device fabrication method includes providing a layout; performing an optical proximity correction on the layout to generate a corrected layout; and forming a photoresist pattern on a substrate by using a photomask fabricated with the corrected layout. The OPC may include: extracting edges of a pattern, the edges including a first edge and a second edge that converge to define a corner; generating a thin mask image by applying a thin mask approximation to the pattern; changing the first edge and the second edge into a first stepped edge and a second stepped edge; and applying a three-dimensional filter to the first and second stepped edges to generate an optical image including the corrected layout of the pattern to which the 3D filter is applied from the thin mask image.

20 Claims, 46 Drawing Sheets

(56) References Cited

U.S. PATENT DOCUMENTS

2019/0187552 A1 6/2019 Choi et al.
2020/0050101 A1 2/2020 Lai et al.
2020/0081336 A1 3/2020 Choi et al.

METHODS FOR OPTICAL PROXIMITY CORRECTION AND METHODS OF FABRICATING SEMICONDUCTOR DEVICE USING THE SAME

CROSS-REFERENCE TO RELATED APPLICATION

This U.S. nonprovisional application claims priority under 35 U.S.C § 119 to Korean Patent Application No. 10-2020-0073876 filed on Jun. 17, 2020, in the Korean Intellectual Property Office, the disclosure of which is hereby incorporated by reference in its entirety.

BACKGROUND

The present inventive concepts relate to methods of fabricating a semiconductor device, and more particularly, to methods of fabricating a semiconductor device using an optical proximity correction (OPC) method.

Semiconductor devices are beneficial in the electronics industry because of their small size, multi-functionality, and/or low fabrication cost. Semiconductor devices may encompass semiconductor memory devices storing logic data, semiconductor logic devices processing operations of logic data, and hybrid semiconductor devices having both memory and logic elements. Semiconductor devices have been increasingly used for high integration with the advanced development of the electronics industry. For example, semiconductor devices have been increasingly requested for high reliability, high speed, and/or multi-functionality. Semiconductor devices have been made more complex and integrated to meet these requested characteristics.

SUMMARY

Some example embodiments of the present inventive concepts provide an optical proximity correction (OPC) method in which a three-dimensional (3D) filter approximation is used.

Some example embodiments of the present inventive concepts provide a method of fabricating a semiconductor device, which method employs an optical proximity correction (OPC) method using 3D filter approximation.

According to some example embodiments of the present inventive concepts, a method of fabricating a semiconductor device may comprise: performing an optical proximity correction (OPC) on a layout of a pattern to generate a corrected layout of the pattern; and forming a photoresist pattern on a substrate by using a photomask fabricated with the corrected layout of the pattern. Performing the OPC may include: extracting edges of the layout of the pattern, the edges including a first edge and a second edge that define a corner having an angle between the first and second edges; defining a bisector that bisects the angle between the first and second edges; changing the first edge and the second edge into a first stepped edge and a second stepped edge on opposite sides of the bisector; and generating an optical image including the corrected layout of the pattern by applying a three-dimensional (3D) filter to the first and second stepped edges.

According to some example embodiments of the present inventive concepts, a method of fabricating a semiconductor device may comprise: providing a layout of a pattern; performing an optical proximity correction (OPC) on the layout to generate a corrected layout of the pattern; and forming a photoresist pattern on a substrate by using a photomask fabricated with the corrected layout. Performing the OPC may include: extracting edges of the pattern, the edges including a first edge and a second edge that converge to define a corner; generating a thin mask image by applying a thin mask approximation to the pattern; changing the first edge and the second edge into a first stepped edge and a second stepped edge; and applying a three-dimensional (3D) filter to the first and second stepped edges to generate an optical image including the corrected layout of the pattern to which the 3D filter is applied from the thin mask image.

According to some example embodiments of the present inventive concepts, a method of fabricating a semiconductor device may comprise: forming on a substrate an active pattern that has a longitudinal axis in a first direction; forming a trench that penetrates an upper portion of the active pattern and extends in a second direction; forming a gate electrode in the trench; forming in the upper portion of the active pattern a first source/drain region and a second source/drain region that are respectively adjacent to opposite sides of the gate electrode; forming a bit line on the active pattern and extending in a third direction, the bit line being coupled to the first source/drain region, and the third direction intersecting the second direction; forming an interlayer dielectric layer on the bit line; forming on the interlayer dielectric layer a plurality of photoresist patterns that extend in the first direction, an opening between the photoresist patterns vertically overlapping the second source/drain region, and each of the photoresist patterns including an edge part having a corner; using the photoresist patterns as a mask to anisotropically etch the interlayer dielectric layer to to expose the second source/drain region through the opening; forming in the opening a contact coupled to the second source/drain region; and forming a data storage element on the contact. The step of forming the photoresist patterns may include performing an optical proximity correction (OPC) on a layout that defines the photoresist patterns. Performing the OPC may include: extracting a first edge and a second edge in the layout that define the corner of the edge part; defining a bisector between the first and second edges; changing the first edge and the second edge into a first stepped edge and a second stepped edge that are across the bisector; and generating an optical image by applying a three-dimensional (3D) filter to the first and second stepped edges.

DETAILED DESCRIPTION

Figure 1:
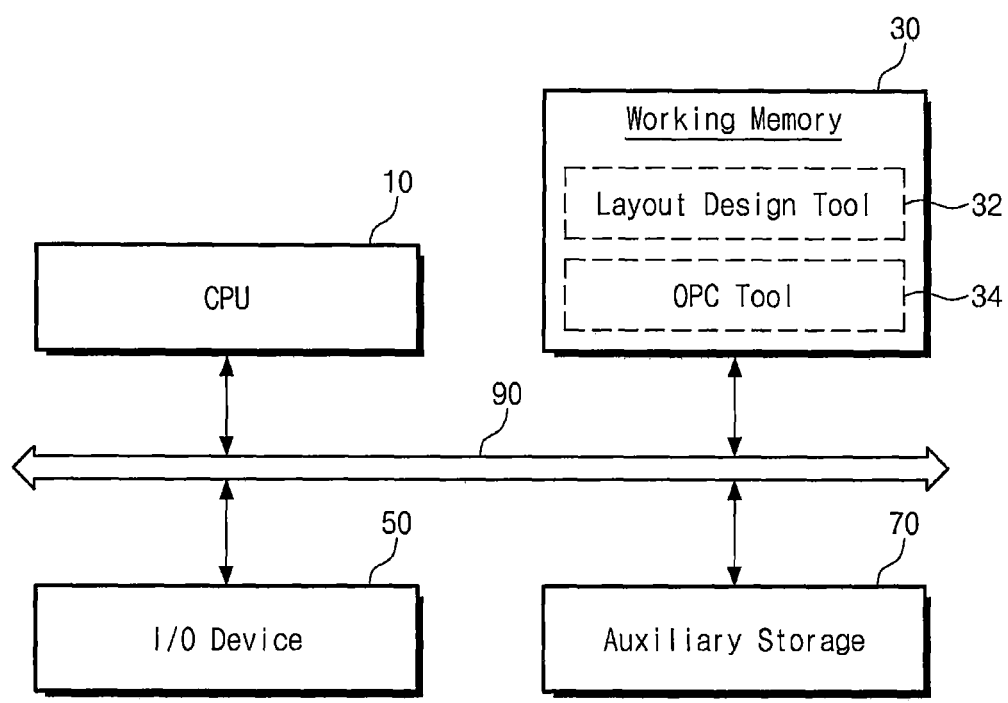
FIG. 1 illustrates a block diagram showing a computer system for semiconductor design according to some example embodiments of the present inventive concepts.

FIG. 1 illustrates a block diagram showing a computer system for semiconductor design according to some example embodiments of the present inventive concepts. Referring to FIG. 1, a computer system may include a central processing unit (CPU) 10, a working memory 30, an input/output device 50, and an auxiliary storage 70. The computer system may be provided as a dedicated device for designing a layout of the present inventive concepts. The computer system may be configured to drive various design and verification simulation programs.

The CPU 10 may allow the computer system to execute software (e.g., application programs, operating system, and device drivers). The CPU 10 may process an operating system (OS, not shown) loaded in the working memory 30. The CPU 10 may execute various application programs driven based on the operating system (OS). For example, the CPU 10 may process a layout design tool 32 and/or an optical proximity correction (OPC) tool 34 that are loaded in the working memory 30.

The OS or application programs may be loaded in the working memory 30. When the computer system is booted up, based on booting sequence, an operating system image (not shown) stored in the auxiliary storage 70 may be loaded to the working memory 30. Overall input/output operations of the computer system may be supported by the OS. The working memory 30 may be loaded with the application programs that are selected by a user or provided for a basic service. The layout design tool 32 and/or the OPC tool 34 may be loaded from the auxiliary storage 70 to the working memory 30.

The layout design tool 32 may include a bias function by which specific layout patterns are changed in shapes and positions defined by a design rule. In addition, the layout design tool 32 may perform a design rule check (DRC) under the changed bias data condition. The OPC tool 34 may perform OPC on layout data output from the layout design tool 32. The working memory 30 may be either a volatile memory such as static random access memory (SRAM) and dynamic random access memory (DRAM) or a nonvolatile memory such as phase change random access memory (PRAM), magnetic random access memory (MRAM), resistance random access memory (ReRAM), ferroelectric random access memory (FRAM), and NOR Flash memory.

The input/output device 50 may control user input/output operations of user interfaces. For example, the input/output device 50 may include a keyboard or a monitor, allowing a designer to input relevant information. The user may use the input/output device 50 to receive information about a semiconductor region or data paths requiring adjusted operating characteristics. The input/output device 50 may display a progress status or a process result of the OPC tool 34.

The auxiliary storage 70 may serve as a storage medium for the computer system. The auxiliary storage 70 may store the application programs, the operating system image, and various data. The auxiliary storage 70 may be provided in the form of one of memory cards (e.g., MMC, eMMC, SD, and Micro SD) and a hard disk drive (HDD). The auxiliary storage 70 may include a NAND Flash memory having large memory capacity. In some embodiments, the auxiliary storage 70 may include a NOR Flash memory or a next-generation volatile memory such as PRAM, MRAM, ReRAM, and FRAM.

A system interconnector 90 may be provided to serve as a system bus for providing a network in the computer system. The CPU 10, the working memory 30, the input/output device 50, and/or the auxiliary storage 70 may be electrically connected through the system interconnector 90 and may exchange data with each other. The system interconnector 90 is not limited to the above description, and may further include intermediary means for efficient management.

Figure 2:
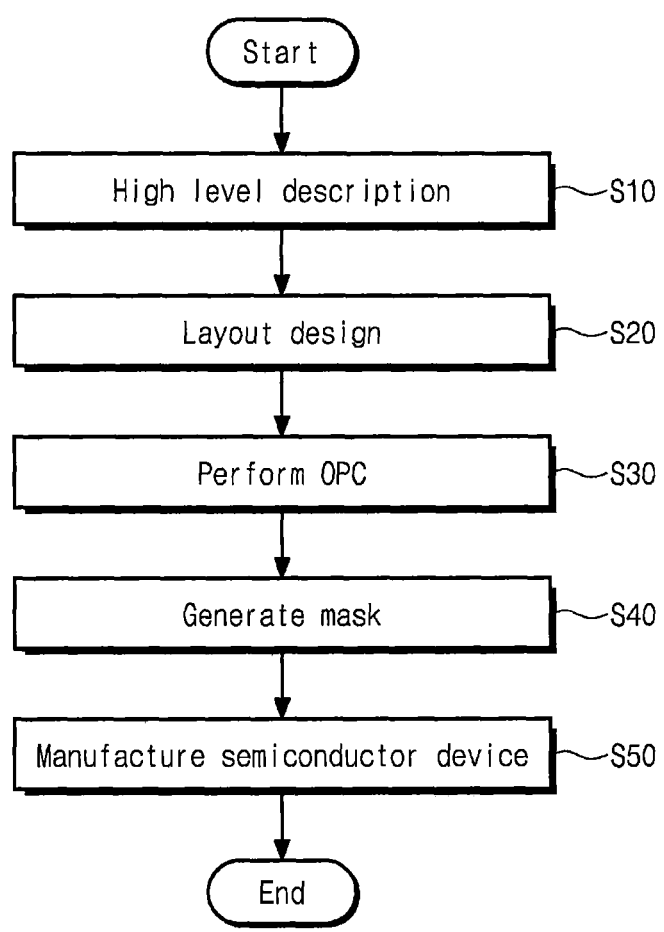
FIG. 2 illustrates a flow chart showing a method of designing and fabricating a semiconductor device according to some example embodiments of the present inventive concepts.

FIG. 2 illustrates a flow chart showing a method of designing and fabricating a semiconductor device according to some example embodiments of the present inventive concepts.

Referring to FIG. 2, a high-level design of a semiconductor integrated circuit may be performed using the computer system discussed with reference to FIG. 1 (S10). The high-level design may mean that an integrated circuit corresponding to a design target is described with a high-level language of a hardware description language. For example, the high-level language such as C language may be used in the high level design. A register transfer level (RTL) coding or simulation may be used to express in detail circuits designed by the high-level design. In addition, codes created by the resist transfer level coding may be converted into a netlist, which netlist may be synthesized to describe an entire semiconductor device. The synthesized schematic circuit may be verified by a simulation tool, and an adjustment process may be performed based on the verified result.

A layout design may be performed to implement on a silicon substrate a semiconductor integrated circuit that is logically completed (S20). For example, the layout design step may be performed based on the schematic circuit synthesized in the high-level design step or the netlist corresponding to the schematic circuit. The layout design step may include a routing step that places and connects various standard cells provided from a cell library, based on a prescribed design rule.

A cell library for the layout design may include information about operation, speed, and power consumption of the standard cell. The cell library for representing a layout of a specific gate-level circuit as a layout may be defined in the layout design tool. The layout may be prepared to define shapes or dimensions of patterns constituting transistors and metal lines that will be practically formed on a silicon substrate. For example, in order to actually form an inverter circuit on a silicon substrate, it may be necessary to appropriately place or describe layout patterns such as PMOS, NMOS, N-WELL, gate electrodes, and metal lines thereon. For this, a search may be first performed to select a suitable one of inverters predefined in the cell library.

Thereafter, a routing step of connecting the selected and provided standard cells may be performed. Specifically, a routing step may be performed to connect the selected and placed standard cells to their overlying lines. The standard cells may be connected to each other through the routing step. A series of these steps may be automatically or manually performed in the layout design tool. A step of placing and routing the standard cells may be automatically performed by an additional Place & Routing tool.

After the routing step, a verification step may be performed on the layout to check whether any portion of the schematic circuit violates the given design rule. The verification step may include a design rule check (DRC) for verifying whether the layout meets the given design rule, an electrical rule check (ERC) for verifying whether there is an issue of an electrical disconnection in the layout, and a layout vs. schematic (LVS) for verifying whether the layout agrees with the gate-level netlist.

An OPC step may be performed (S30). A photolithography process may be employed to achieve on a silicon substrate the layout patterns obtained by the layout design step. The optical proximity correction process may be a technique for correcting an unintended optical effect that occurs in the photolithography process. For example, the optical proximity correction process may correct an undesirable phenomenon, such as refraction or process side effects caused by characteristics of light in an exposure process using the layout patterns. When the optical proximity correction step is performed, the designed layout patterns may be slightly changed (or biased) in shapes and positions. The optical proximity correction step will be further discussed in detail with reference to FIGS. 3 to 8.

A photomask may be generated based on the layout changed by the optical proximity correction step (S40). The photomask may generally be manufactured by describing the layout patterns using a chromium layer coated on a glass substrate.

The generated photomask may be used to manufacture a semiconductor device (S50). Various exposure and etching processes may be repeatedly performed in manufacturing the semiconductor device using the photomask. Through these processes discussed above, patterns defined in the layout design may be sequentially formed on a silicon substrate.

Figure 3:
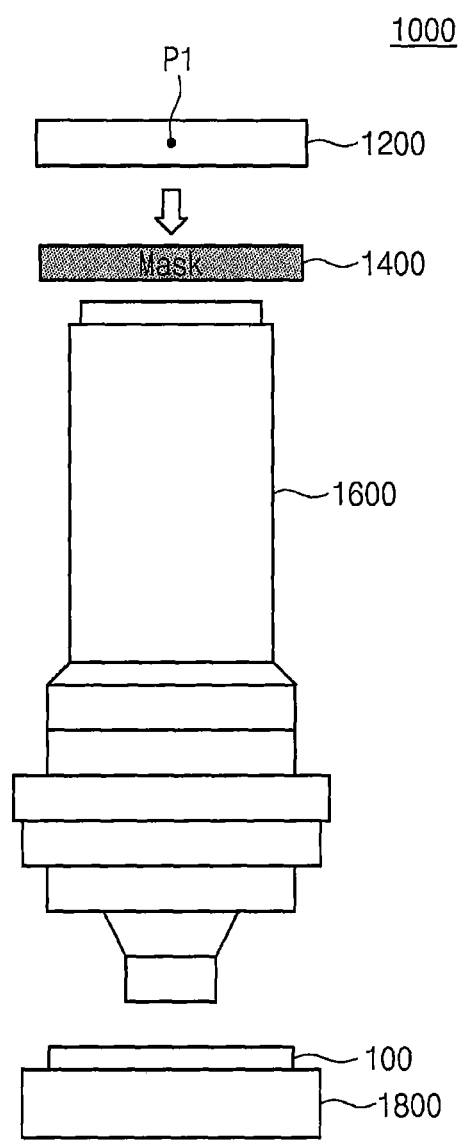
FIG. 3 illustrates a conceptual diagram showing a photolithography system that uses a photomask manufactured according to some example embodiments of the present inventive concepts.

FIG. 3 illustrates a conceptual diagram showing a photolithography system that uses a photomask manufactured according to some example embodiments of the present inventive concepts. The photolithography system 1000 may include a light source 1200, a photomask 1400, a reduction projection apparatus 1600, and a substrate stage 1800. The photolithography system 1000 may further include components not shown in FIG. 3. For example, the photolithography system 1000 may further include a sensor used for measuring height and slope of a surface of a substrate 100.

The light source 1200 may emit light. The light emitted from the light source 1200 may travel toward the photomask 1400. For example, the light source 1200 and the photomask 1400 may be provided therebetween with a sensor that adjusts a focus of the light. The light source 1200 may include an ultraviolet light source (e.g., KrF light source with wavelength of 234 nm or ArF light source with wavelength of 193 nm) or an extreme ultraviolet (EUV) light source. For example, an extreme ultraviolet (EUV) light source may be adopted as the light source 1200 according to some example embodiments of the present inventive concepts. The light source 1200 may include a single point light source P1, but the present inventive concepts are not limited thereto. In some example embodiments, the light source 1200 may include a plurality of point light sources.

The photomask 1400 may include image patterns to print (implement) a designed layout on the substrate 100. The image patterns may be formed based on layout patterns obtained from the layout design and the optical proximity correction that are discussed above. The image patterns may be defined by a transparent region and an opaque region. The transparent region may be formed by etching a metal layer (e.g., a chromium layer) on the photomask 1400. The transparent region may be transparent to the light emitted from the light source 1200. In contrast, the opaque region may not allow the light to pass therethrough, but may block the light.

The reduction projection apparatus 1600 may receive the light that passes through the photomask 1400. The reduction projection apparatus 1600 may match layout patterns, which will be printed on the substrate 100, with the image patterns of the photomask 1400. The substrate 100 may receive the light that passes through the reduction projection apparatus 1600. Therefore, the substrate 100 may be printed thereon with patterns that correspond to the image patterns of the photomask 1400.

The substrate stage 1800 may support the substrate 100. For example, the substrate 100 may be a silicon wafer. The reduction projection apparatus 1600 may include an aperture. The aperture may be used to increase a depth of focus of ultraviolet light emitted from the light source 1200. For example, the aperture may include a dipole aperture or a quadruple aperture. The reduction projection apparatus 1600 may further include a lens to adjust a focus of light.

An increase in integration of semiconductor devices may induce a relatively small distance between the image patterns of the photomask 1400. Such "proximity" may cause interference and diffraction of light, and distorted patterns may be printed on the substrate 100. When distorted patterns are printed on the substrate 100, designed circuits may abnormally operate.

Resolution enhancement technology may be used to prevent the pattern distortion. An optical proximity correction (see S30 of FIG. 2) may be an example of the resolution enhancement technology. According to the optical proximity correction, it may be possible to predict the degree of distortion such as interference and diffraction of light. Based on predicted results, a designed layout may be changed (biased). Based on the changed layout, image patterns may be formed on the photomask 1400, and desired patterns may then be printed on the substrate 100.

A layout of a semiconductor device may include a plurality of layers. For example, the optical proximity correction may be performed to adjust a layout of a single layer. To be specific, the optical proximity correction may be independently performed on each of the plurality of layers. The plurality of layers may be sequentially implemented through semiconductor processes on a substrate, which may result in the formation of a semiconductor device. For example, a semiconductor device may include a plurality of stacked metal layers to achieve a specific circuit.

Figure 4:
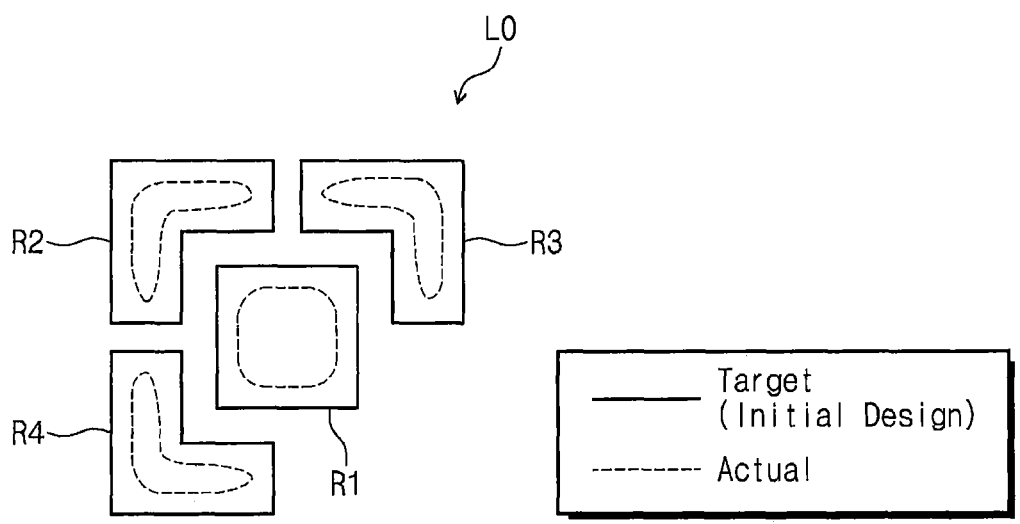
FIG. 4 illustrates a conceptual diagram showing a layout according to some example embodiments of the present inventive concepts.

FIG. 4 illustrates a conceptual diagram showing a layout according to some example embodiments of the present inventive concepts. FIG. 4 shows solid lines to indicate target patterns which will be intentionally printed on the substrate 100 of FIG. 3. In contrast, FIG. 4 depicts dotted lines to denote actual patterns that are practically printed on the substrate 100 of FIG. 3.

A designed layout LO may include first, second, third, and fourth circuit patterns R1, R2, R3, and R4. A shape of the designed layout LO shown in FIG. 4 may be an example to facilitate understanding of the present inventive concepts, but the present inventive concepts are not limited thereto. The designed layout LO may be provided as an initially designed layout. Solid lines of the first, second, third, and fourth circuit patterns R1, R2, R3, and R4 shown in FIG. 4 may signify target patterns which will be intentionally achieved on the substrate 100.

As discussed above, an implementation of patterns on the substrate 100 may induce distortion such as interference and diffraction of light. When the image patterns of the photomask 1400 are formed based on the solid lines shown in FIG. 4, the substrate 100 may be provided thereon with the first, second, third, and fourth circuit patterns R1, R2, R3, and R4 that are implemented in pattern shapes designated by the dotted lines of FIG. 4. When the substrate 100 is provided thereon with distorted patterns indicated by the dotted lines of FIG. 4, designed circuits may abnormally operate.

An optical proximity correction may be performed to prevent the pattern distortion. The layout LO designed through the optical proximity correction may be changed (biased) to reduce errors between the actual patterns (the dotted lines of FIG. 4) and the target patterns (the solid lines of FIG. 4). The image patterns of the photomask 1400 may be formed based on a biased layout. When the photomask 1400 is used to perform a photolithography process, the substrate 100 may be printed thereon with actual patterns that have substantially the same shapes as those of the first, second, third, and fourth circuit patterns R1, R2, R3, and R4 of the designed layout LO.

Figure 5:
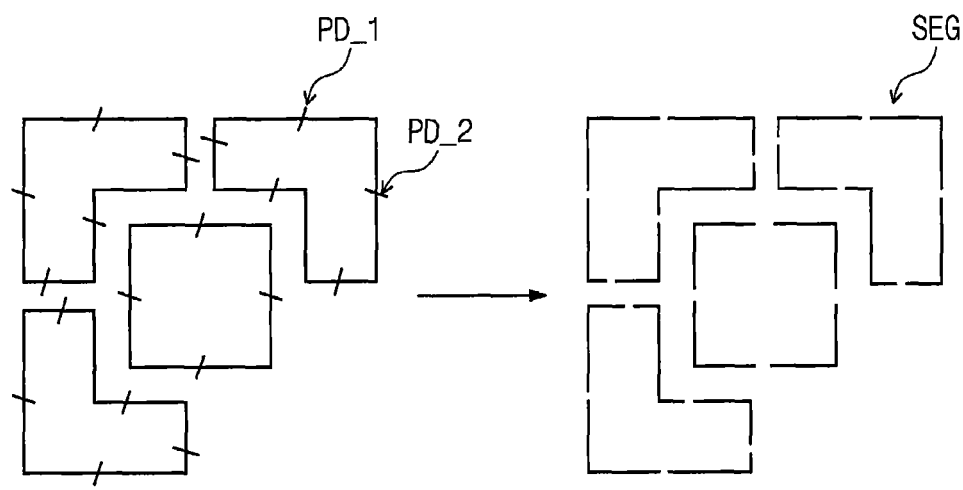
FIG. 5 illustrates a conceptual diagram showing a procedure in which a contour of the layout designed in FIG. 4 is divided into a plurality of segments in an optical proximity correction.

FIG. 5 illustrates a conceptual diagram showing a procedure in which a contour of the designed layout depicted in FIG. 4 is divided into a plurality of segments in an optical proximity correction. Referring to FIG. 5, a plurality of division points may be provided on a contour of the designed layout. For example, a first division point PD_1 and a second division point PD_2 may be set on the contour of the designed layout. A single segment SEG may be obtained based on the first and second division points PD_1 and PD_2. Similarly, based on a plurality of division points, the contour of the designed layout may be divided into a plurality of segments.

In this description, the term "division" may not mean physical division. FIG. 5 depicts that a plurality of segments are physically divided from each other, but this is conceptually provided to aid understanding.

Figure 6:
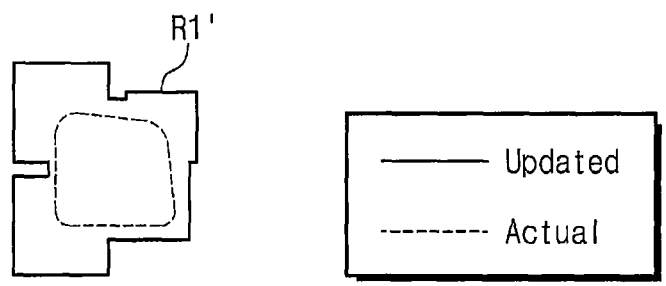
FIG. 6 illustrates a conceptual diagram showing a corrected layout in the optical proximity correction of FIG. 5.

In an optical proximity correction, each of the divided segments SEG may become a target for bias. Each of the divided segments SEG may be biased independently of each other. For example, independently of other segments SEG, one segment SEG may be biased along one of a first direction (e.g., a positive or outward direction) and a second direction (e.g., a negative or inward direction). Each of the divided segments SEG may be biased to reduce errors between a target pattern and an actual pattern that is implemented on the substrate 100. The OPC tool 34 of FIG. 1 may be employed to bias the divided segments SEG. FIG. 6 shows an example of an updated layout obtained based on the biased segments.

FIG. 6 illustrates a conceptual diagram showing a layout corrected by the optical proximity correction of FIG. 5. Referring to FIG. 6, an updated first correction pattern R1' may be provided which is corrected from the first circuit pattern R1 of FIG. 4. An explanation about the second, third, and fourth circuit patterns R2, R3, and R4 of FIG. 4 will be omitted for convenience of description. As discussed above with reference to FIG. 5, a contour of the first circuit pattern R1 of FIG. 4 may be divided into a plurality of segments, and each of the plurality of divided segments may be biased. As shown in FIG. 6, each segment may be biased along one of the first direction (e.g., the positive or outward direction) and the second direction (e.g., the negative or inward direction). In this case, some segments may not be biased. Therefore, the first correction pattern R1' may be obtained.

In FIG. 6, a dotted line may indicate an actual pattern which will be practically printed through a corrected layout on the substrate 100 of FIG. 3. When each of divided segments is biased, it may be possible to reduce errors between an actual pattern and a target pattern.

Figure 7:
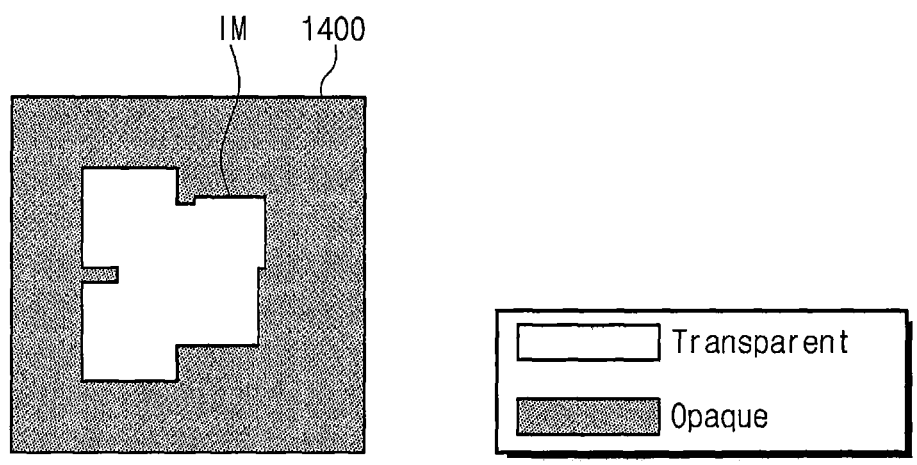
FIG. 7 illustrates a conceptual diagram showing a photomask manufactured based on the corrected layout of FIG. 6.

FIG. 7 illustrates a conceptual diagram showing a photomask 1400 manufactured based on the corrected layout of FIG. 6. For example, referring to FIG. 7, the photomask 1400 may include an image pattern IM that corresponds to the first correction pattern R1' of FIG. 6. The photomask 1400 may include a transparent region and an opaque region. The opaque region may block light without allowing the light to pass therethrough. In contrast, the transparent region may be transparent to the light emitted from the light source 1200. The substrate 100 of FIG. 3 may receive the light that passes through the photomask 1400. For example, when a photolithography process uses a negative photoresist, the image pattern IM may be the transparent region of the photomask 1400.

Figure 8:
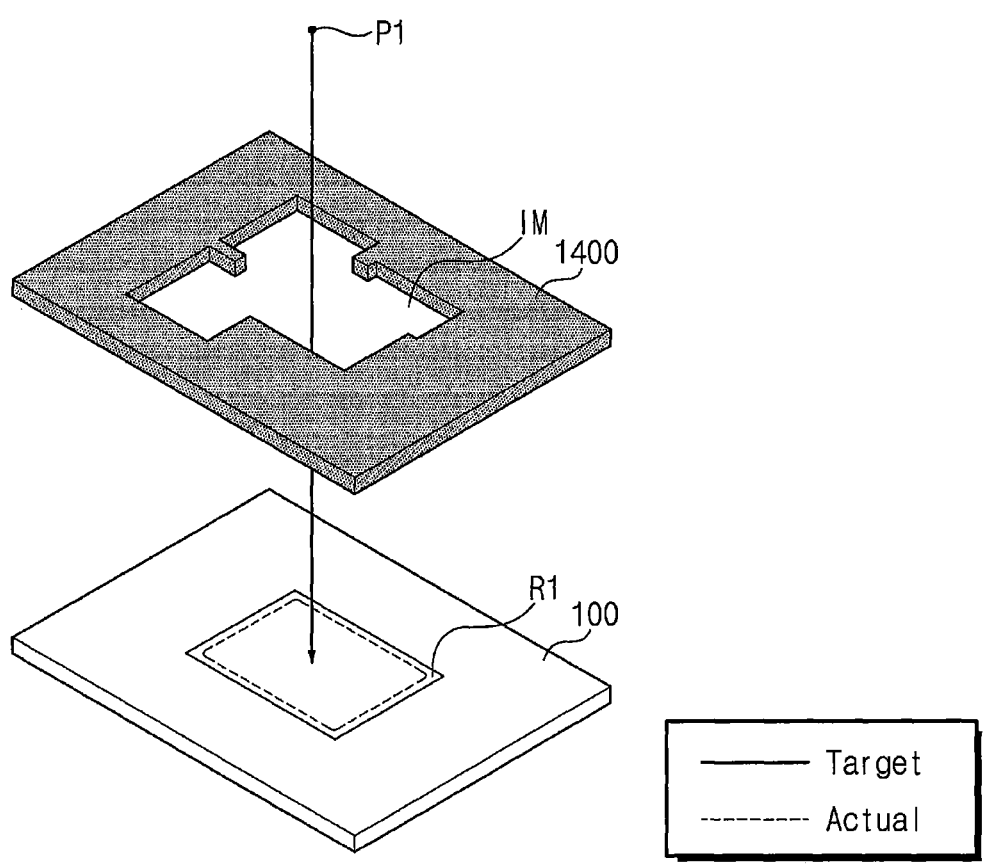
FIG. 8 illustrates a conceptual diagram showing how the photomask of FIG. 7 is used to print a circuit pattern on a substrate.

FIG. 8 illustrates a conceptual diagram showing how the photomask of FIG. 7 is used to print a circuit pattern on a substrate. The point light source P1 of the light source 1200 depicted in FIG. 3 may emit light toward the photomask 1400. The emitted light may pass through the transparent region of the image pattern IM, and then may travel toward the negative photoresist on the substrate 100 (an exposure process). On the photoresist, a region on which the light is irradiated may remain, and a region on which no light is irradiated may be removed (a development process). Therefore, the first circuit pattern R1 corresponding to the image pattern IM may be printed on the substrate 100.

An actual pattern indicated by a dotted line may be printed on the substrate 100. The actual pattern may have substantially the same shape and size as those of a target pattern indicated by a solid line. In conclusion, the optical proximity correction may minimize errors between the actual pattern and the target pattern.

Figure 9:
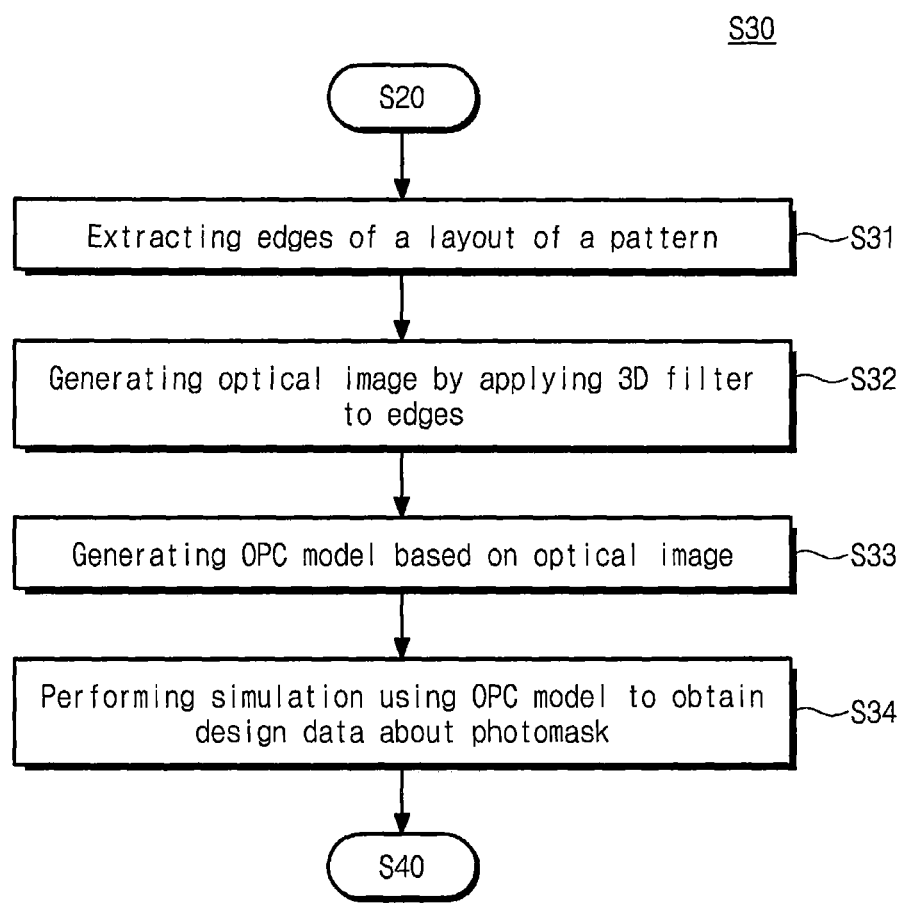
FIG. 9 illustrates a simplified flow chart showing an optical proximity correction according to some example embodiments of the present inventive concepts.
Figure 10:
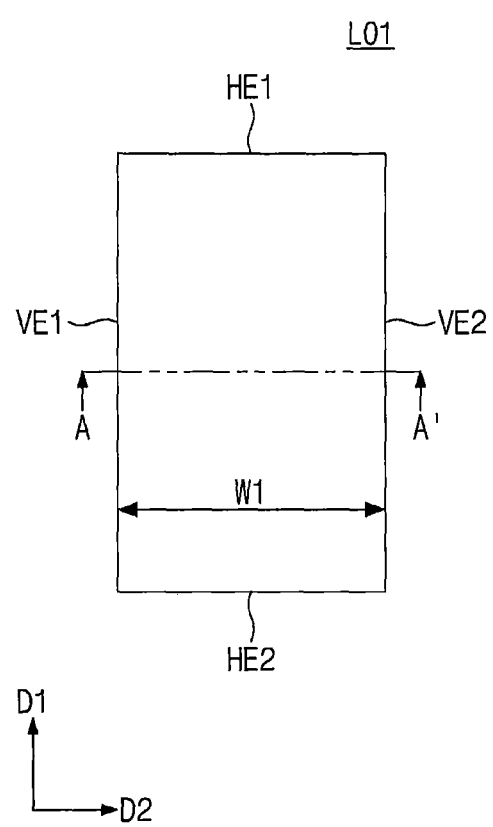
FIG. 10 illustrates a plan view showing a layout of a first pattern.
Figure 11:
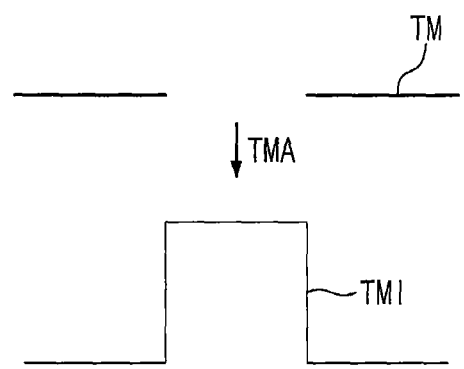
FIG. 11 illustrates a thin mask image taken along line A-A' of FIG. 10.
Figure 12:
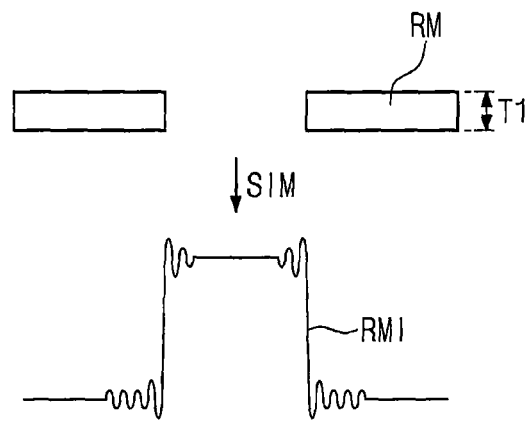
FIG. 12 illustrates an actual mask image taken along line A-A' of FIG. 10.

FIG. 9 illustrates a simplified flow chart showing an optical proximity correction according to some example embodiments of the present inventive concepts. FIG. 10 illustrates a plan view showing a layout of a first pattern. FIG. 11 illustrates a thin mask image taken along line A-A' of FIG. 10. FIG. 12 illustrates an actual mask image taken along line A-A' of FIG. 10.

Referring to FIG. 10, there may be presented an exemplary plan view showing a layout LO1 of a first pattern. For example, the layout LO1 of the first pattern may refer to the designed layout LO discussed above with reference to FIG. 4.

As discussed above with reference to FIGS. 3 to 8, characteristics of an exposure process may generally cause a difference in shape between a target pattern on a substrate and an image pattern on a photomask. In addition, as the image pattern on the photomask is reduced, projected, and transferred onto the substrate, the image pattern on the photomask may have a size greater than that of the target pattern on the substrate.

A layout of a pattern may have a one-dimensional (1D) or two-dimensional (2D) shape. In this description, the language "1D shape" may not mean a line without its area, but may mean a unidirectional extended shape such as a line-and-space pattern. The language "edges" may correspond to lines that surround a perimeter of the layout of the pattern. Alternatively, the language "edges" may correspond to lines that surround a space between layouts of patterns.

Referring back to FIG. 10, the layout LO1 of the first pattern may have a tetragonal 2D shape. The layout LO1 of the first pattern may have a first vertical edge VE1 and a second vertical edge VE2 that are in parallel to a first direction D1. The layout LO1 of the first pattern may have a first horizontal edge HE1 and a second horizontal edge HE2 that are in parallel to a second direction D2.

The layout LO1 of the first pattern may have a first width W1 in the second direction D2. The first width W1 may define a width of a target pattern which will be intentionally implemented on a substrate through the layout LO1 of the first pattern, and the width of the target pattern may be greater than about 30 nm.

FIG. 11 is an optical image obtained when using an ideal thin photomask TM achieved with the layout of FIG. 10. To be specific, FIG. 11 depicts a cross-sectional mask image taken along line A-A' of FIG. 10. For example, FIG. 11 shows an optical image TMI (referred to as herein a thin mask image) obtained by a thin mask approximation (TMA).

The thin mask image TMI of FIG. 11 may be provided in the form of a signal numerically related to intensity of light that passes through the thin photomask TM. Therefore, a part covered with the thin photomask TM is illustrated to indicate a lower level of the light intensity, and a part exposed by the thin photomask TM is illustrated to indicate a higher level of the light intensity. In this description, the ideal thin photomask TM may be a photomask whose thickness is near zero, in which photomask an opened portion may allow light to completely pass through and a closed portion may forbid light to completely pass through.

FIG. 12 is an optical image obtained when using an actual photomask RM achieved with the layout of FIG. 10. The actual photomask RM may have a thickness T1. Based on the thickness T1 of the actual photomask RM, the thin mask image TMI of FIG. 11 may be different from an optical image RMI (referred to as herein an actual mask image) denoting light that passes through the actual photomask RM. The actual mask image RMI may be an optical image calculated through a rigorous simulation SIM such as a finite difference time domain (FDTD) simulation.

A difference may be provided between the thin mask image TMI of FIG. 11 and the actual mask image RMI of FIG. 12. For example, the thin mask image TMI and the actual mask image RMI may significantly differ from each other in terms of a part corresponding to a pattern edge. For example, the actual mask image RMI and the thin mask image TMI may become identical to each other as departing from the part corresponding to the pattern edge.

When using the rigorous simulation discussed above, it may be possible to obtain a mask near-field image that exactly reflects a pattern shape on a photomask, but there may be a problem that calculation consumes much time.

Therefore, a compact simulation model may be used to calculate an optical image of a photomask, and a domain decomposition method (DDM) may be frequently employed in practice. The DDM may be a method in which a pattern on a photomask splits into domains, and then a 3D filter approximation such as an edge filter approximation is used to obtain the optical image. For example, the DDM may be carried out such that the finite difference time domain (FDTD) simulation is employed to allow a filter library to store an edge filter value calculated in advance for each width/space of a pattern, and that the edge filter value for each edge is taken from the filter library when calculating an optical image for each pattern, thereby calculating an optical image almost identical to an optical image calculated through the rigorous simulation. The DDM may thus generate an optical image in which 3D effects of the photomask are effectively corrected.

An optical image using the 3D filter approximation may be generated when an edge filter, which will be discussed below, is applied to the optical image TMI obtained by the thin mask approximation (TMA) discussed above with reference to FIG. 11. The following will describe in detail a method of generating an optical image by using the 3D filter approximation according to the present inventive concepts.

Figure 13:
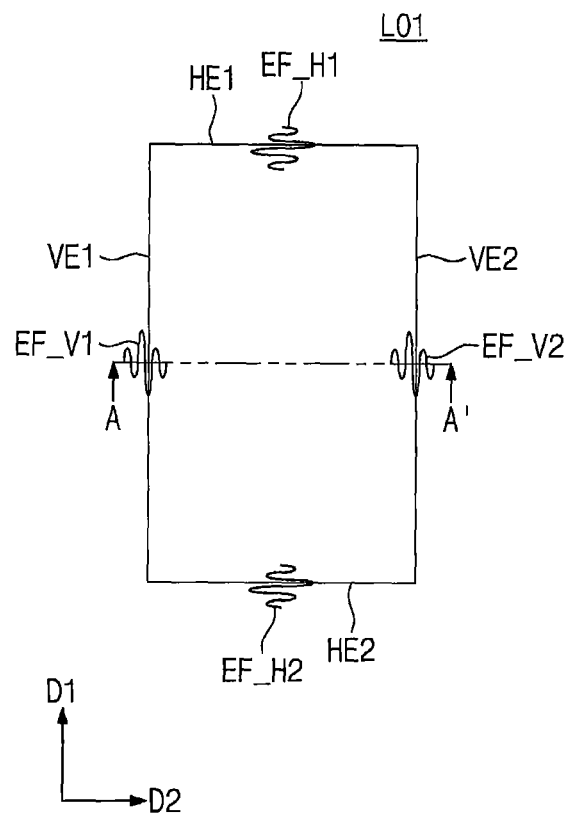
FIG. 13 illustrates a plan view showing a layout of a first pattern to which an edge filter is applied.
Figure 14:
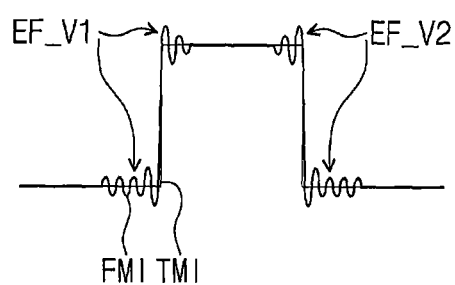
FIG. 14 illustrates a cross-sectional mask image taken along line A-A' of FIG. 13.

FIG. 13 illustrates a plan view showing a layout of a first pattern to which an edge filter is applied. FIG. 14 illustrates a cross-sectional mask image taken along line A-A' of FIG. 13.

Referring to FIGS. 9 and 13, there may be an extraction of edges (e.g., the first and second vertical edges VE1 and VE2 and the first and second horizontal edges HE1 and HE2) of the layout LO1 of the first pattern (S31). The extracted edge(s) may be applied thereto with a 3D filter to correct 3D effects of the photomask (S32). For example, the 3D filter may include an edge filter. The edge filter may include a vertical (90°) filter EF_V and a horizontal (0°) filter EF_H.

The horizontal filter EF_H may be a filter applied to an edge parallel to a preset direction (e.g., the second direction D2). The vertical filter EF_V may be a filter applied to an edge parallel to a direction (e.g., the first direction D1) perpendicular to the preset direction.

A first vertical filter EF_V1 and a second vertical filter EF_V2 may be respectively applied to the first vertical edge VE1 and the second vertical edge VE2. A first horizontal filter EF_H1 and a second horizontal filter EF_H2 may be respectively applied to the first horizontal edge HE1 and the second horizontal edge HE2. The first and second vertical filters EF_V1 and EF_V2 and the first and second horizontal filters EF_H1 and EF_H2 may be filters stored in a filter library. For convenience, FIG. 12 depicts simplified wave shapes to correspondingly indicate the first and second vertical filters EF_V1 and EF_V2 and the first and second horizontal filters EF_H1 and EF_H2.

Referring to FIGS. 9 and 14, an edge filter may be applied to the thin mask image TMI obtained in FIG. 12, and thus a mask image FMI may be acquired (S32). The mask image FMI of FIG. 14 may be an optical image using the 3D filter approximation. For example, on the thin mask image TMI, the first and second vertical filters EF_V1 and EF_V2 may be applied to parts corresponding to the first and second vertical edges VE1 and VE2, respectively. The mask image FMI obtained by application of the edge filter may be substantially the same as the actual mask image RMI of FIG. 12.

Referring back to FIG. 9, after generating the mask image FMI or the optical image, an optical proximity correction (OPC) model may be produced based on the optical image (S33). Afterwards, a simulation using the OPC model may be performed to obtain design data about the photomask (S34).

An OPC method according to the present inventive concepts may include the generation of the optical image (S32), the production of the OPC model (S33), and the acquirement of the design data (S34). However, the OPC method according to the present inventive concepts may further include other procedures.

An optical proximity effect (OPE) may occur due to effects between neighboring fine patterns during an exposure process, and the OPC method may be a way of overcoming the OPE, in which method a pattern layout is corrected to suppress the occurrence of the OPE. The OPC method may be broadly classified into two types, a rule-based OPC method and a simulation-based or model-based OPC method. A model-based OPC method may be adopted as the OPC method according to some example embodiments.

In the OPC method, basic data for the optical proximity correction (OPC) may be first prepared. The basic data may include data about pattern shapes of a sample, positions of patterns, kinds of measurement such as measurement for space or line of patterns, basic measurement values, and the like. In addition, the basic data may include information about a thickness, a refractive index, and a dielectric constant of photoresist (PR), and also include a source map about shapes of illumination system. The basic data is not limited to those data examples discussed above.

After the preparation of the basic data, an optical OPC model may be generated. The generation of the optical OPC model may include optimization of a defocus start (DS) position and of a best focus (BF) position in an exposure process. In addition, the generation of the optical OPC model may include production of an optical image in consideration of diffraction of light or optical states of exposure equipment. The optical image previously obtained by using the 3D filter approximation may be used to generate the optical OPC model. The generation of the optical OPC model, however, is not limited thereto. For example, the generation of the optical OPC model may include various contents related to optical phenomena of an exposure process.

After the optical OPC model is generated, an OPC model for PR may be generated. The generation of the OPC model for PR may include optimization of a threshold value of PR. The threshold value of PR may mean a threshold value at which a chemical change occurs in an exposure process, and may be provided as, for example, intensity of exposure light. The generation of the OPC model for PR may include selection of an appropriate form from various PR model forms.

In general, the optical OPC model and the OPC model for PR may be collectively called an OPC model. An OPC modeling, or a generation procedure for the OPC modeling, may thus be defined to include both a procedure for generating the optical OPC model and a procedure for generating the OPC model for PR. Unless otherwise noted below, the OPC model is used as a concept for combination of the optical OPC model and the OPC model for PR.

The OPC model may be verified after its generation. The verification of the OPC model may be performed through an edge placement error (EPE) check or a root mean square (RMS) calculation for critical dimension (CD) error. When the OPC model is included in a preset specification, the verification of the OPC model may be completed and a corresponding OPC model may be selected as an OPC model for simulation. When the OPC model is not included in a preset specification, there may be a repetition of the generation of the OPC model, or the procedure for generating the optical OPC model and/or the OPC model for PR.

After the OPC model is verified, the corresponding OPC model may be used to perform a simulation. The simulation using the OPC model may obtain design data of a photomask close to actual measurement. The design data of the photomask obtained through the simulation may then be transferred to a mask production team as mask tape-out (MTO) design data for photomask fabrication.

According to some example embodiments of the present inventive concepts, the mask image FMI may be generated by a compact simulation performed at high rates, and may bring about almost the same result as that of the actual mask image RMI that consumes a long calculation time. Therefore, an exact OPC model may be produced through an optical image calculated at high rates.

Figure 15:
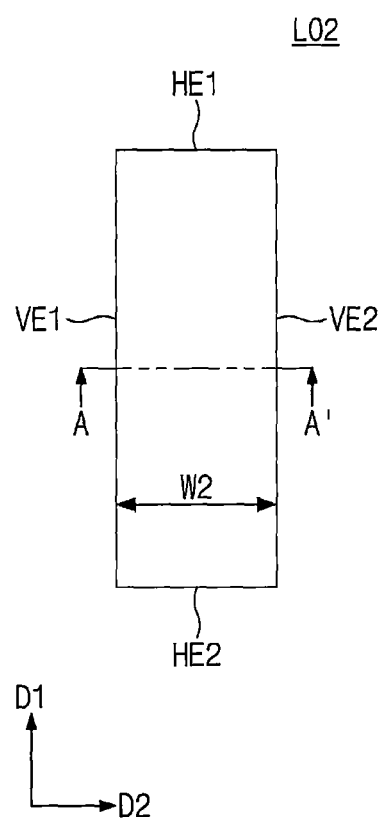
FIG. 15 illustrates a plan view showing a layout of a second pattern.
Figure 16:
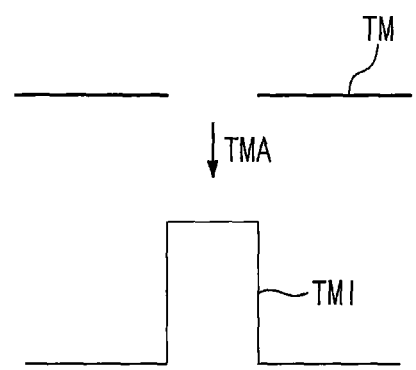
FIG. 16 illustrates a thin mask image taken along line A-A' of FIG. 15.
Figure 17:
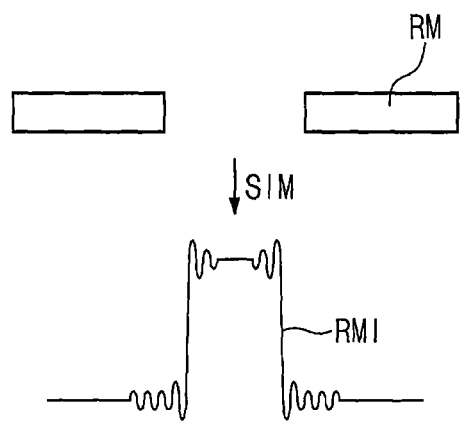
FIG. 17 illustrates an actual mask image taken along line A-A' of FIG. 15.

FIG. 15 illustrates a plan view showing a layout LO2 of a second pattern. FIG. 16 illustrates a thin mask image taken along line A-A' of FIG. 15. FIG. 17 illustrates an actual mask image taken along line A-A' of FIG. 15.

Referring to FIG. 15, there may be presented an exemplary plan view showing a layout LO2 of a second pattern. The layout LO2 of the second pattern may have a tetragonal 2D shape. The layout LO2 of the second pattern may have a first vertical edge VE1 and a second vertical edge VE2 that are in parallel to the first direction D1. The layout LO2 of the second pattern may have a first horizontal edge HE1 and a second horizontal edge HE2 that are in parallel to the second direction D2.

The layout LO2 of the second pattern may have a second width W2 in the second direction D2. The second width W2 may be less than the first width W1 of the layout LO1 of the first pattern. The second width W2 may define a width of a target pattern which will be intentionally implemented on a substrate through the layout LO2 of the second pattern, and the width of the target pattern may be less than about 30 nm.

For the layout LO1 of the first pattern discussed above, a coupling effect may be negligibly small between neighboring edges because a corresponding target pattern has a relatively large width. Therefore, only an edge filter may be applied as a 3D filter to the layout LO1 of the first pattern. In contrast, for the layout LO2 of the second pattern according to some example embodiments, a coupling effect may be great between neighboring edges because a corresponding target pattern has a relatively small width. Therefore, when an edge filter is simply applied to the layout LO2 of the second pattern, an obtained mask image (or optical image) may be largely deviated from a result of the finite difference time domain (FDTD) simulation. According to the present inventive concepts, a 3D filter applied to the layout LO2 of the second pattern may include an edge filter and additionally a coupling filter in consideration of coupling effects between neighboring edges.

FIG. 16 is an optical image obtained when using an ideal thin photomask TM achieved with the layout of FIG. 15. For example, FIG. 16 shows an optical image TMI (referred to as herein a thin mask image) obtained by the thin mask approximation (TMA).

FIG. 17 is an optical image obtained when using an actual photomask RM achieved with the layout of FIG. 15. The optical image shown in FIG. 17 may be an actual mask image RMI, or an optical image calculated through the rigorous simulation SIM. It may be ascertained that a difference is provided between the thin mask image TMI of FIG. 16 and the actual mask image RMI of FIG. 17. The following will describe in detail a method of generating an optical image by using the 3D filter approximation according to the present inventive concepts.

Figure 18:
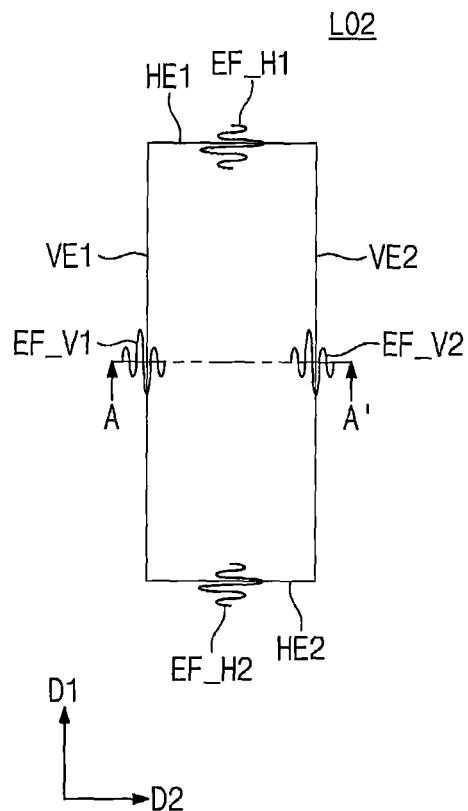
FIG. 18 illustrates a plan view showing a layout of a second pattern to which an edge filter is applied.
Figure 19:
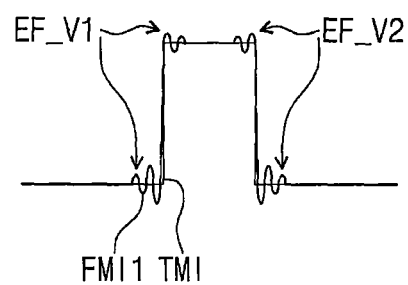
FIG. 19 illustrates a cross-sectional mask image taken along line A-A' of FIG. 18.
Figure 20:
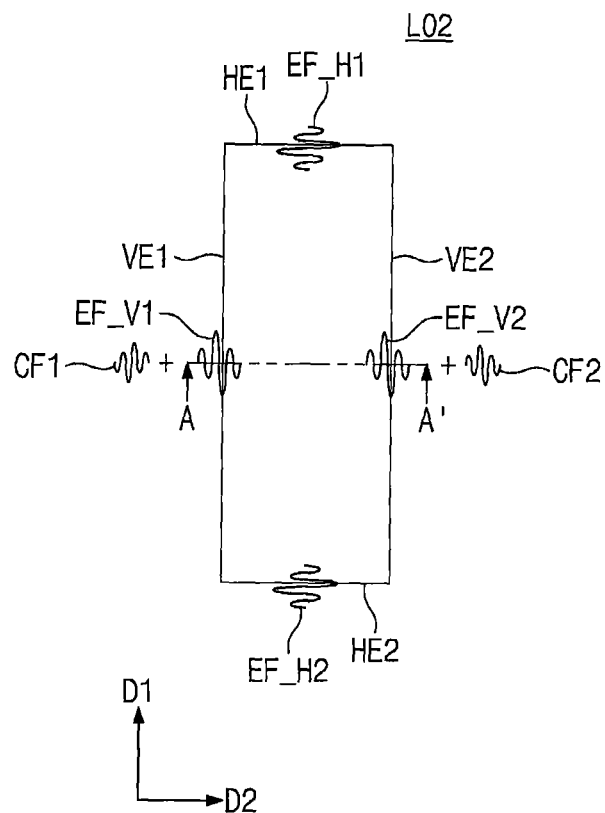
FIG. 20 illustrates a plan view showing a layout of a second pattern to which a coupling filter is additionally applied.
Figure 21:
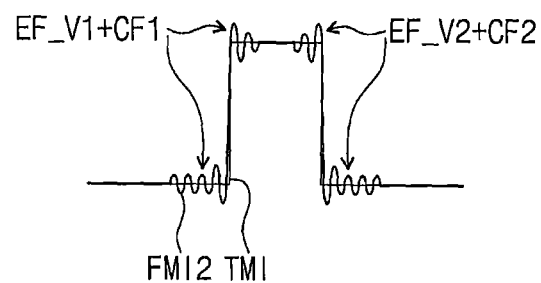
FIG. 21 illustrates a cross-sectional mask image taken along line A-A' of FIG. 20.

FIG. 18 illustrates a plan view showing a layout of a second pattern to which an edge filter is applied. FIG. 19 illustrates a cross-sectional mask image taken along line A-A' of FIG. 18. FIG. 20 illustrates a plan view showing a layout of a second pattern to which a coupling filter is additionally applied. FIG. 21 illustrates a cross-sectional mask image taken along line A-A' of FIG. 20.

Referring to FIGS. 9 and 18, there may be an extraction of edges, or the first and second vertical edges VE1 and VE2 and the first and second horizontal edges HE1 and HE2, of the layout LO2 of the second pattern (S31). The extracted edge(s) may be applied thereto with a 3D filter to correct 3D effects of the photomask. For example, the 3D filter according to some example embodiments may include an edge filter and a coupling filter. First, the edge filter may be applied to the extracted edge.

For example, a first vertical filter EF_V1 and a second vertical filter EF_V2 may be respectively applied to the first vertical edge VE1 and the second vertical edge VE2. A first horizontal filter EF_H1 and a second horizontal filter EF_H2 may be respectively applied to the first horizontal edge HE1 and the second horizontal edge HE2.

Referring to FIGS. 9 and 19, an edge filter may be applied to the thin mask image TMI obtained depicted in FIG. 16, and thus a first mask image FMI1 may be acquired (S32). The first mask image FMI1 of FIG. 19 may be similar to the mask image FMI discussed above in FIG. 14.

Referring to FIGS. 9 and 20, there may be an extraction of edges, or the first and second vertical edges VE1 and VE2, at each of which a coupling effect occurs (S31). The extracted edge(s) may be applied thereto with a coupling filter to correct 3D effects of the photomask. The first and second horizontal edges HE1 and HE2 may have small coupling effects because of a large interval therebetween, and thus may be excluded from extraction targets to which the coupling filter is applied.

A first coupling filter CF1 and a second coupling filter CF2 may be respectively applied to the first vertical edge VE1 and the second vertical edge VE2. The first and second coupling filters CF1 and CF2 may be stored in a filter library. For convenience, FIG. 20 shows a simple wave form to indicate repetitive application of edge and coupling filters.

Referring to FIGS. 9 and 21, a coupling filter may be applied to the first mask image FMI1 obtained in FIG. 19, and thus a second mask image FMI2 may be acquired (S32). The second mask image FMI2 of FIG. 21 may be an optical image to which edge and coupling filters are both applied as 3D filters. For example, the first and second coupling filters CF1 and CF2 may be additionally applied to parts that correspond to the first and second vertical edges VE1 and VE2, respectively, in the first mask image FMI1.

According to some example embodiments, it may be ascertained that a difference is provided between the actual mask image RMI of FIG. 17 and the first mask image FMI1 of FIG. 19 to which only an edge filter is applied. In addition, it may also be ascertained that the actual mask image RMI of FIG. 17 is substantially the same as the second mask image FMI2 of FIG. 21 obtained when a coupling filter is additionally applied to the first mask image FMI1. As a result, because the 3D filter approximation includes an edge filter and additionally includes a coupling filter in consideration of coupling effects, it may be possible to increase accuracy of an optical image generated with the 3D filter approximation.

Referring back to FIG. 9, after generating the second mask image FMI2 or an optical image, an optical proximity correction (OPC) model may be produced based on the optical image (S33). Afterwards, a simulation using the OPC model may be performed to obtain design data about the photomask (S34).

Figure 22:
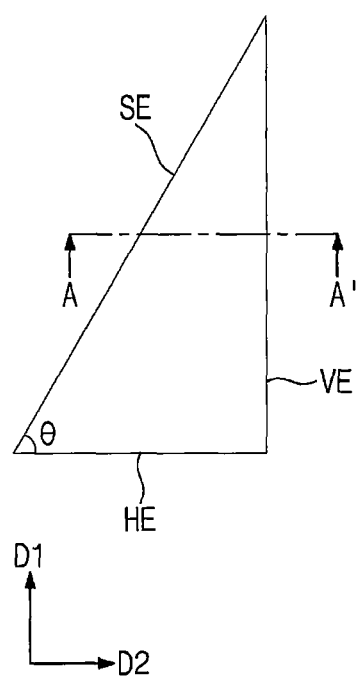
FIG. 22 illustrates a plan view showing a layout of a third pattern.
Figure 23:
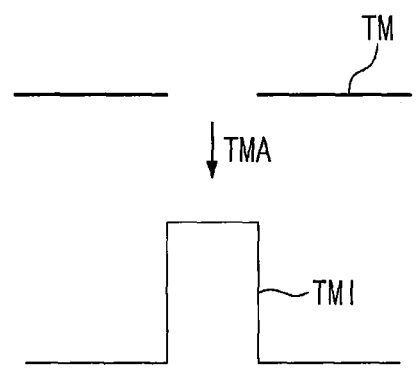
FIG. 23 illustrates a thin mask image taken along line A-A' of FIG. 22.
Figure 24:
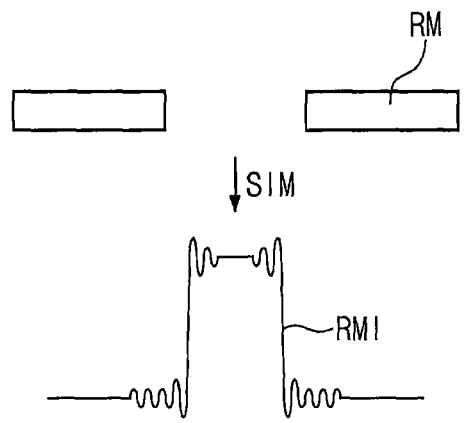
FIG. 24 illustrates an actual mask image taken along line A-A' of FIG. 22.

FIG. 22 illustrates a plan view showing a layout LO3 of a third pattern. FIG. 23 illustrates a thin mask image taken along line A-A' of FIG. 22. FIG. 24 illustrates an actual mask image taken along line A-A' of FIG. 22.

Referring to FIG. 22, there may be presented an example plan view showing a layout LO3 of a third pattern. The layout LO3 of the third pattern may have a triangular 2D shape. The layout LO3 of the third pattern may include a vertical edge VE, a horizontal edge HE, and a slant edge SE. The slant edge SE may have any angle θ relative to the horizontal edge HE.

As the layout LO3 of the third pattern additionally has an edge of any angle θ in addition to an edge of a vertical direction (90°) and an edge of a horizontal direction (0°), it may be required to apply an additional filter to the edge of any angle θ. Therefore, the 3D filter according to some example embodiments may include an edge filter and also include an any-angle filter that is applied to the edge of any angle θ.

The any-angle filter may include an edge filter applied to an edge of any angle other than the first and second directions D1 and D2. For example, the any-angle filter may be applied when a slant edge (e.g., slant edge SE) is present at a pattern layout. Moreover, the any-angle filter may also be applied when a curvilinear edge is present at a pattern layout.

FIG. 23 is an optical image obtained when using an ideal thin photomask TM achieved with the layout of FIG. 22. For example, FIG. 23 shows an optical image TMI, or a thin mask image, obtained by the thin mask approximation (TMA).

FIG. 24 is an optical image obtained when using an actual photomask RM achieved with the layout of FIG. 22. The optical image shown in FIG. 24 may be an actual mask image RMI, or an optical image calculated through the rigorous simulation SIM. It may be ascertained that a difference is provided between the thin mask image TMI of FIG. 23 and the actual mask image RMI of FIG. 24. The following will describe in detail a method of generating an optical image by using the 3D filter approximation according to the present inventive concepts.

Figure 25:
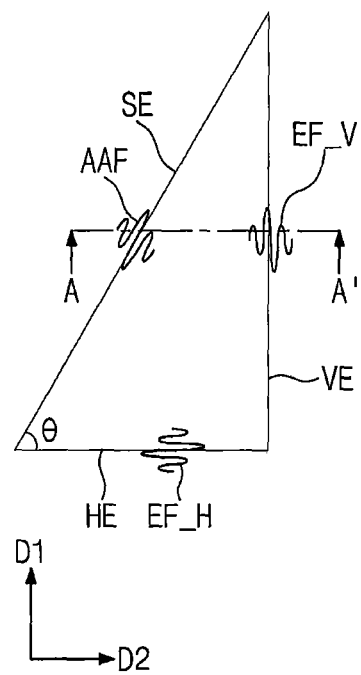
FIG. 25 illustrates a plan view showing a layout of a third pattern to which an edge filter and an any-angle filter are applied.
Figure 26:
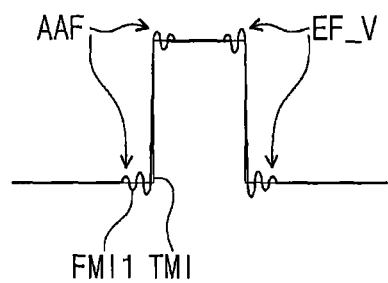
FIG. 26 illustrates a cross-sectional mask image taken along line A-A' of FIG. 25.
Figure 27:
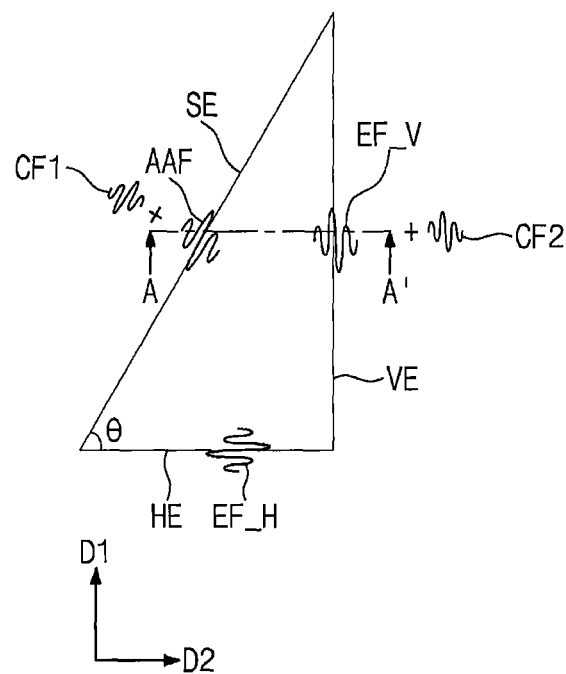
FIG. 27 illustrates a plan view showing a layout of a third pattern to which a coupling filter is additionally applied.
Figure 28:
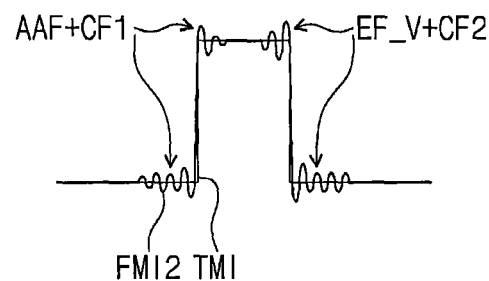
FIG. 28 illustrates a cross-sectional mask image taken along line A-A' of FIG. 27.

FIG. 25 illustrates a plan view showing a layout of a third pattern to which an edge filter and an any-angle filter are applied. FIG. 26 illustrates a cross-sectional mask image taken along line A-A' of FIG. 25. FIG. 27 illustrates a plan view showing a layout of a third pattern to which a coupling filter is additionally applied. FIG. 28 illustrates a cross-sectional mask image taken along line A-A' of FIG. 27.

Referring to FIGS. 9 and 25, there may be an extraction of edges of the layout LO3 of the third pattern, or of the vertical edge VE, the horizontal edge HE, and the slant edge SE (S31). The extracted edge(s) may be applied thereto with a 3D filter to correct 3D effects of the photomask. For example, the 3D filter according to some example embodiments may include an edge filter, an any-angle filter, and a coupling filter. A vertical filter EF_V may be applied to the extracted vertical edge VE, a horizontal filter EF_H may be applied to the extracted horizontal edge HE, and an any-angle filter AAF may be applied to the extracted slant edge SE.

Referring to FIGS. 9 and 26, an edge filter and an any-angle filter may be applied to the thin mask image TMI obtained in FIG. 25, and thus a first mask image FMI1 may be produced (S32).

Referring to FIGS. 9 and 27, there may be an extraction of edges, or the vertical edge VE and the slant edge SE adjacent to each other, at which coupling effects occur (S31). The extracted edge may be applied thereto with a 3D filter to correct 3D effects of the photomask. For example, a first coupling filter CF1 and a second coupling filter CF2 may be respectively applied to the slant edge SE and the vertical edge VE.

Referring to FIGS. 9 and 28, a coupling filter may be applied to the first mask image FMI1 obtained in FIG. 26, and thus a second mask image FMI2 may be produced (S32). The second mask image FMI2 of FIG. 26 may be similar to the second mask image FMI2 discussed above in FIG. 21.

It may be ascertained that the second mask image FMI2 of FIG. 28 is substantially the same as the actual mask image RMI of FIG. 24. According to some example embodiments, because an any-angle filter is also applied to a slant edge, the 3D filter approximation according to the present inventive concepts may also be performed on a 2D pattern having an arbitrary shape. Furthermore, it may be possible to increase accuracy of the 3D filter approximation for the 2D pattern having an arbitrary shape.

Figure 29:
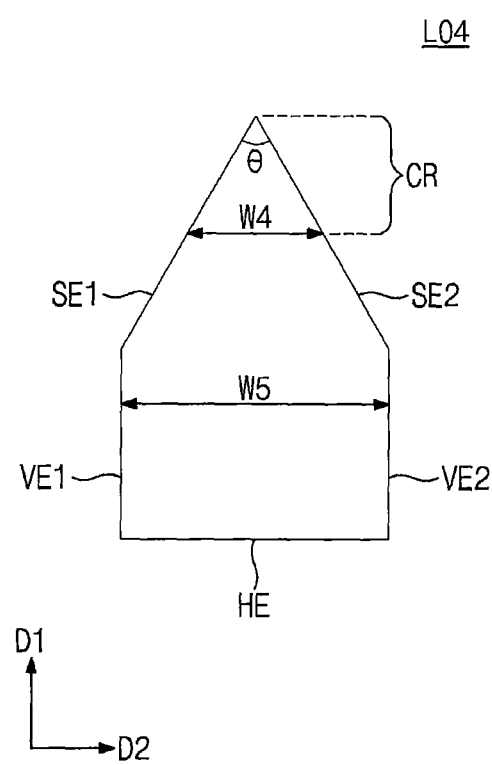
FIG. 29 illustrates a plan view showing a layout of a fourth pattern.

FIG. 29 illustrates a plan view showing a layout LO4 of a fourth pattern. The layout LO4 of the fourth pattern may have a pencil-like 2D shape (e.g., a rectangular shape combined with a triangular shape). The layout LO4 of the fourth pattern may have a first vertical edge VE1, a second vertical edge VE2, a horizontal edge HE, a first slant edge SE1, and a second slant edge SE2. The first slant edge SE1 and the second slant edge SE2 may meet each other to define a corner having an angle θ. According to the present inventive concepts, the angle θ of the corner may range from about 0° to about 180°. For example, according to the present inventive concepts, the angle θ of the corner may be an acute angle between about 0° to about 90°. The layout LO4 of the fourth pattern may have a fourth width W4 between the first slant edge SE1 and the second slant edge SE2. The fourth width W4 may decrease in the first direction D1. The layout LO4 of the fourth pattern may have a fifth width W5 between the first vertical edge VE1 and the second vertical edge VE2. The fifth width W5 may be greater than the fourth width W4.

A corner region CR may be defined to refer to an area where a width defined by the fourth width W4 is less than about 30 nm. A large coupling effect may occur between neighboring edges of the corner region CR, or between the first and second slant edges SE1 and SE2.

Figure 30:
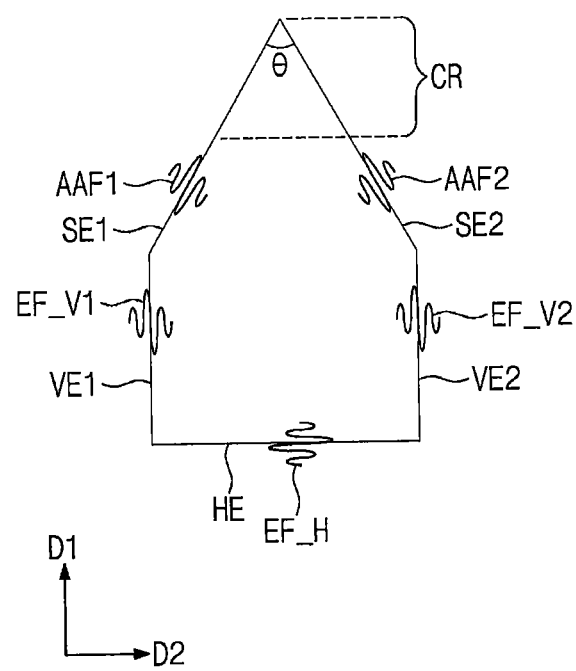
FIG. 30 illustrates a plan view showing a layout of a fourth pattern to which an edge filter and an any-angle filter are applied.

FIG. 30 illustrates a plan view showing a layout of a fourth pattern to which an edge filter and an any-angle filter are applied. Referring to FIGS. 9 and 30, the extracted edge(s) may be applied thereto with a coupling filter to correct 3D effects of the photomask. For example, a first vertical filter EF_V1 and a second vertical filter EF_V2 may be respectively applied to the first vertical edge VE1 and the second vertical edge VE2. A horizontal filter EF_H may be applied to the horizontal edge HE. A first any-angle filter AAF1 and a second any-angle filter AAF2 may be respectively applied to the first slant edge SE1 and the second slant edge SE2.

Figure 31:
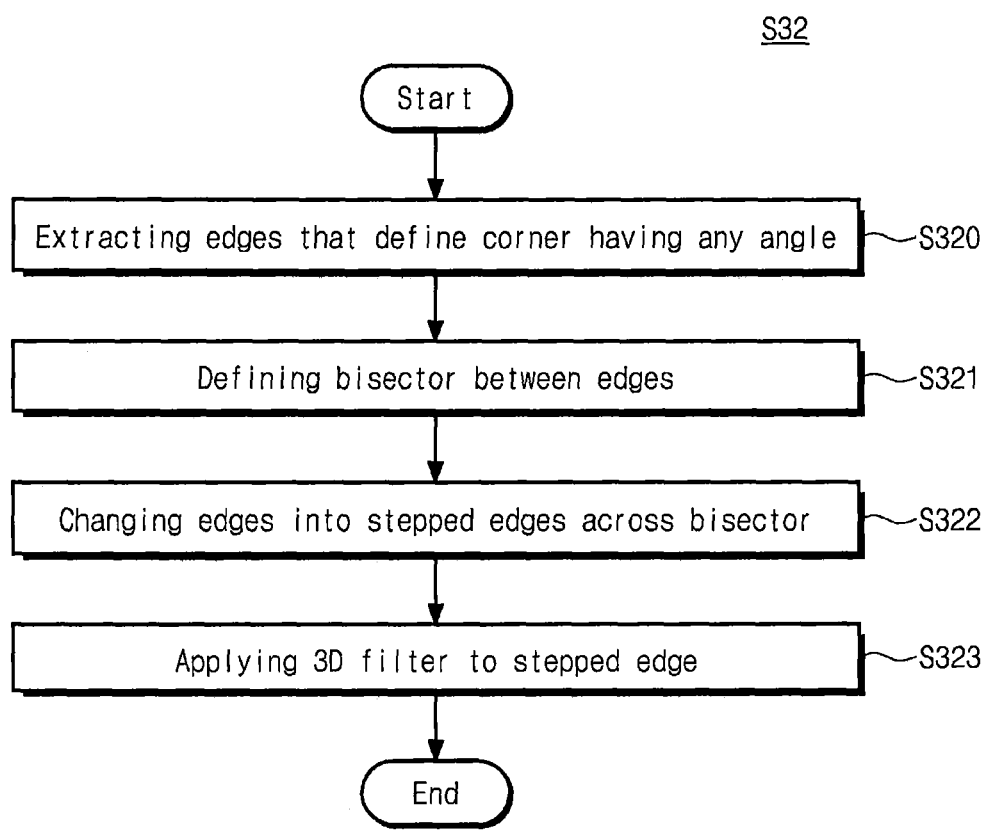
FIG. 31 illustrates a flow chart showing a 3D filter approximation according to some example embodiments of the present inventive concepts.
Figure 32:
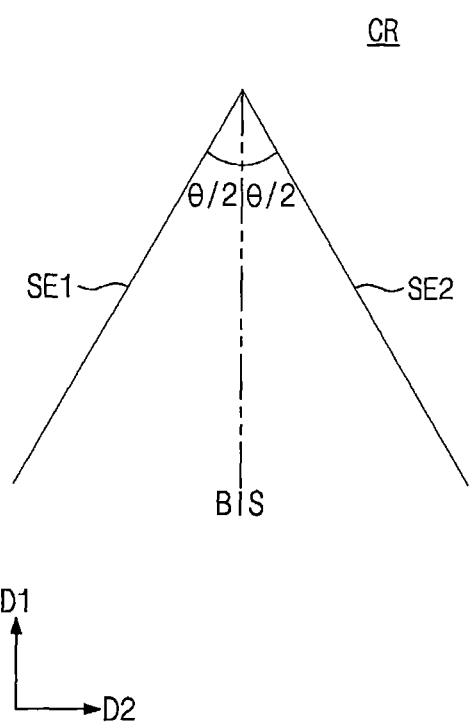
FIGS. 32, 33, and 35 illustrate plan views of first and second slant edges extracted from FIG. 30, showing the 3D filter approximation of FIG. 31.
Figure 33:
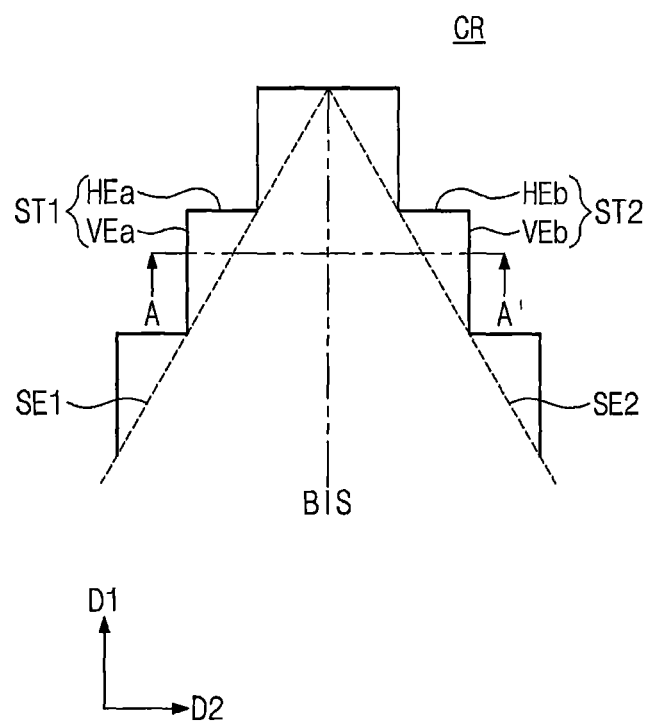
Figure 34:
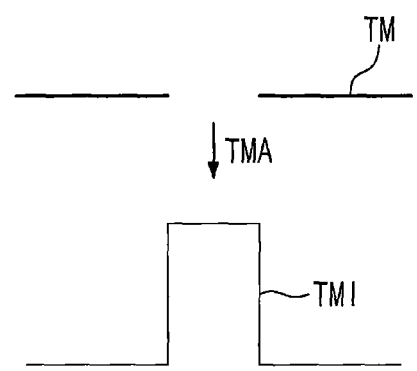
FIG. 34 illustrates a thin mask image taken along line A-A' of FIG. 33.
Figure 35:
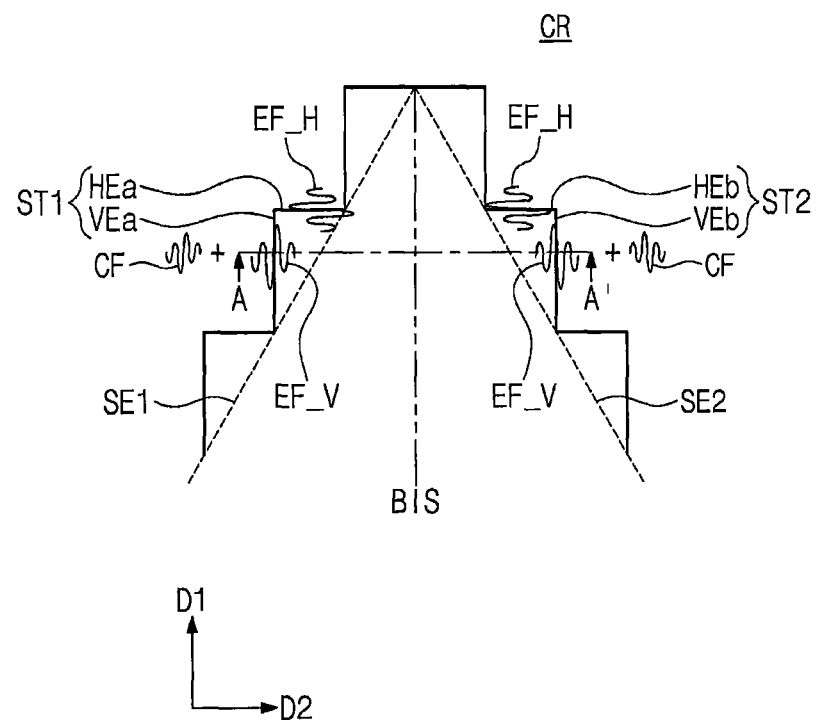
Figure 36:
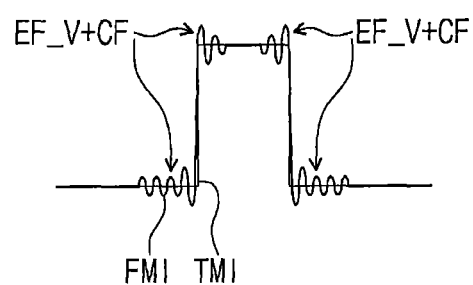
FIG. 36 illustrates a cross-sectional mask image taken along line A-A' of FIG. 35.

FIG. 31 illustrates a flow chart showing a 3D filter approximation method according to some example embodiments of the present inventive concepts. FIGS. 32, 33, and 35 illustrate plan views of first and second slant edges extracted from FIG. 30, showing the 3D filter approximation of FIG. 31. FIG. 34 illustrates a thin mask image taken along line A-A' of FIG. 33. FIG. 36 illustrates a cross-sectional mask image taken along line A-A' of FIG. 35.

Referring to FIGS. 31 and 32, the first and second slant edges SE1 and SE2 of the corner region CR may be extracted (S320). The first and second slant edges SE1 and SE2 may meet each other to define a corner having an angle θ. A bisector BIS may be defined to bisect the angle θ of the corner (S321). An angle of θ/2 may be provided between the bisector BIS and the first slant edge SE1, and an angle of θ/2 may be provided between the bisector BIS and the second slant edge SE2.

Referring to FIGS. 31 and 33, each of the first and second slant edges SE1 and SE2 may be changed into a stepped shape (S322). For example, a manhattanization procedure may be performed on each of the first and second slant edges SE1 and SE2. The first slant edge SE1 may be changed into a first stepped edge ST1, and the second slant edge SE2 may be changed into a second stepped edge ST2. The manhattanization procedure may be executed around the bisector BIS. For example, the first stepped edge ST1 and the second stepped edge ST2 may be symmetrical with each other about the bisector BIS.

The first stepped edge ST1 may include first fine horizontal edges HEa and first fine vertical edges VEa that are arranged alternately with each other. The second stepped edge ST2 may include second fine horizontal edges HEb and second fine vertical edges VEb that are arranged alternately with each other.

FIG. 34 illustrates a thin mask image TMI taken along line A-A' of FIG. 33. The thin mask image TMI may have opposite sidewalls that correspond to the first fine vertical edge VEa and the second fine vertical edge VEb.

Referring to FIGS. 31 and 35, a 3D filter may be applied to each of the first and second stepped edges ST1 and ST2 (S323). For example, a horizontal filter EF_H may be applied to each of the first fine horizontal edges HEa of the first stepped edge ST1, and a vertical filter EF_V may be applied to each of the first fine vertical edges VEa of the first stepped edge ST1. A horizontal filter EF_H may be applied to each of the second fine horizontal edges HEb of the second stepped edge ST2, and a vertical filter EF_V may be applied to each of the second fine vertical edges VEb of the second stepped edge ST2.

A coupling filter CF may be additionally applied to each of the first and second fine vertical edges VEa and VEb. A relatively small distance may be provided between the first and second fine vertical edges VEa and VEb that are adjacent to each other, and thus a coupling effect may occur between the first and second fine vertical edges VEa and VEb that are adjacent to each other. In contrast, a coupling effect may be relatively small between the first and second fine horizontal edges HEa and HEb, and thus no coupling filter may be applied to the first fine horizontal edge HEa and the second fine horizontal edge HEb.

FIG. 36 shows a mask image taken along line A-A' of FIG. 35. A 3D filter according to the present inventive concepts may be applied to a thin mask image TMI obtained in FIG. 34, and thus a mask image FMI may be produced. The mask image FMI obtained according to some example embodiments may be quite similar to an actual mask image.

According to some example embodiments, even though a pattern layout includes a corner with any angle, a manhattanization procedure may be performed to effectively apply a 3D filter on the pattern layout. In conclusion, according to the present inventive concepts, it may be possible to increase accuracy of the 3D filter approximation for an arbitrarily shaped 2D pattern.

Figure 37:
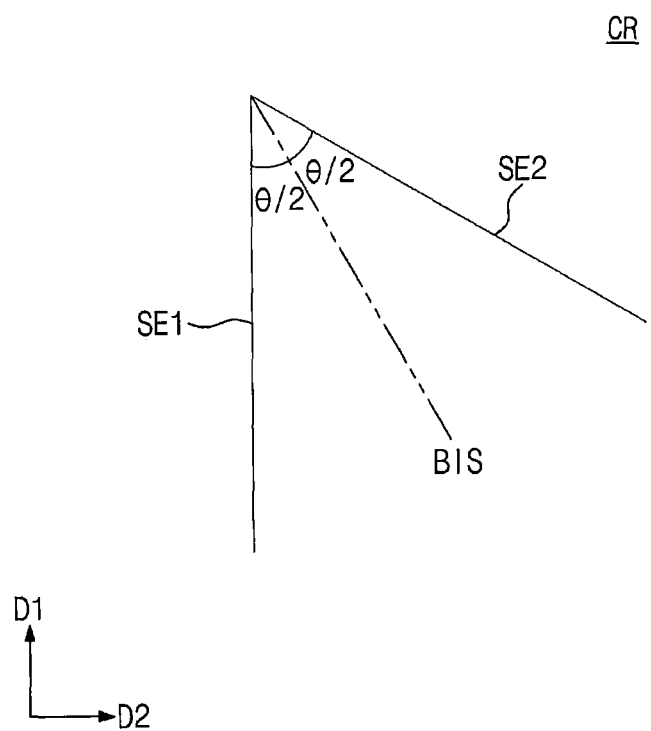
FIGS. 37, 38, and 39 illustrate plan views of a corner region extracted from FIG. 30, showing the 3D filter approximation of FIG. 31.
Figure 38:
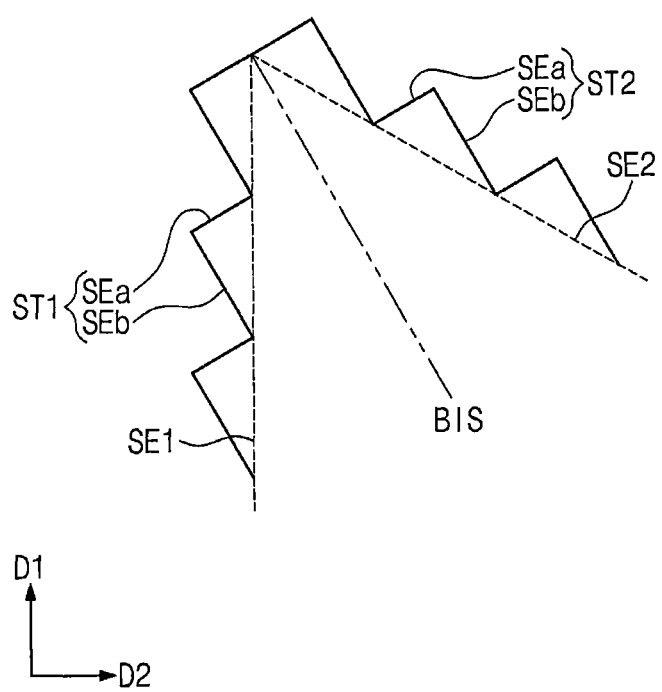
Figure 39:
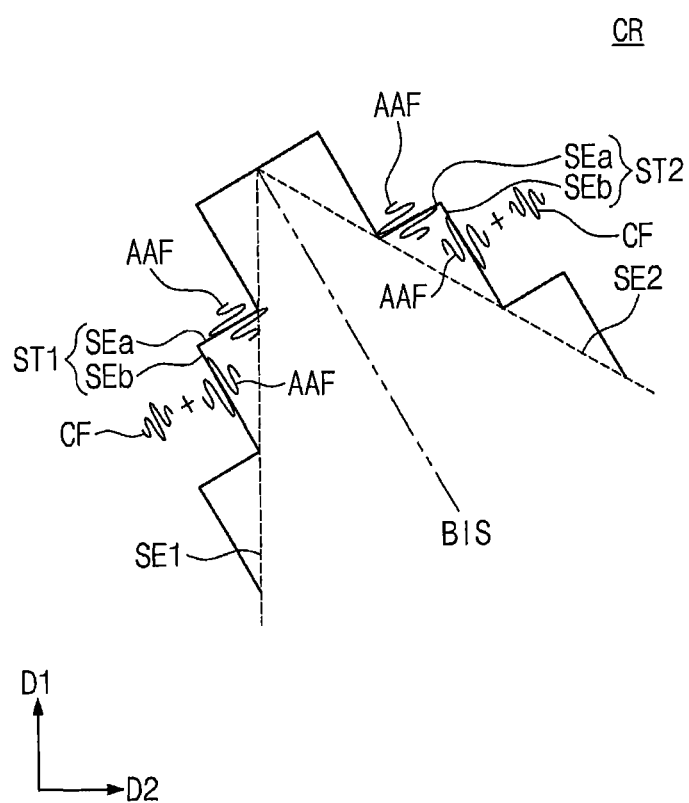

FIGS. 37, 38, and 39 illustrate plan views of a corner region extracted from FIG. 30, showing the three-dimensional (3D) filter approximation of FIG. 31. A corner region CR according to some example embodiments may have a shape obtained when the corner region CR of FIG. 32 rotates at about 30° in a counterclockwise direction.

Referring to FIGS. 31 and 37, first and second slant edges SE1 and SE2 of the corner region CR may be extracted (S320). The first and second slant edges SE1 and SE2 may meet each other to define a corner having an angle θ (e.g., any angle θ). A bisector BIS may be defined to bisect the angle θ of the corner. An angle of θ/2 may be provided between the bisector BIS and the first slant edge SE1, and an angle of θ/2 may be provided between the bisector BIS and the second slant edge SE2.

Referring to FIGS. 31 and 38, a manhattanization procedure may be performed to allow the first and second slant edges SE1 and SE2 to change into first and second stepped edges ST1 and ST2, respectively (S322). The manhattanization procedure may be executed around the bisector BIS.

For example, each of the first and second stepped edges ST1 and ST2 may include first fine slant edges SEa and second fine slant edges SEb that are arranged alternately with each other. Each of the second fine slant edges SEb may be parallel to the bisector BIS. Each of the first fine slant edges SEa may be perpendicular to the bisector BIS.

Referring to FIGS. 31 and 39, a 3D filter may be applied to each of the first and second stepped edges ST1 and ST2 (S323). For example, an any-angle filter AAF may be applied to each of the first and second fine slant edges SEa and SEb of the first and second stepped edges ST1 and ST2.

A coupling filter CF may be additionally applied to each of the first and second fine slant edges SEb. A relatively small distance may be provided between the second fine slant edge SEb of the first stepped edge ST1 and its adjacent second fine slant edge SEb of the second stepped edge ST2, and thus a coupling effect may occur between the second fine slant edge SEb of the first stepped edge ST1 and its adjacent second fine slant edge SEb of the second stepped edge ST2.

According to some example embodiments, when a stepped edge produced through manhattanization is formed of fine slant edges having any angles, an any-angle filter may be applied instead of vertical and horizontal filters. Therefore it may be possible to increase accuracy of the 3D filter approximation for the 2D pattern having an arbitrary shape.

FIGS. 40, 42, 44, 46, 48, 50, and 52 illustrate plan views showing a method of fabricating a semiconductor device according to some example embodiments of the present inventive concepts. FIGS. 41A, 43A, 45A, 47A, 49A, 51A, and 53A illustrate cross-sectional views taken along line A-A' of FIGS. 40, 42, 44, 46, 48, 50, and 52, respectively. FIGS. 41B, 43B, 45B, 47B, 49B, 51B, and 53B illustrate cross-sectional views taken along line B-B' of FIGS. 40, 42, 44, 46, 48, 50, and 52, respectively.

Figure 40:
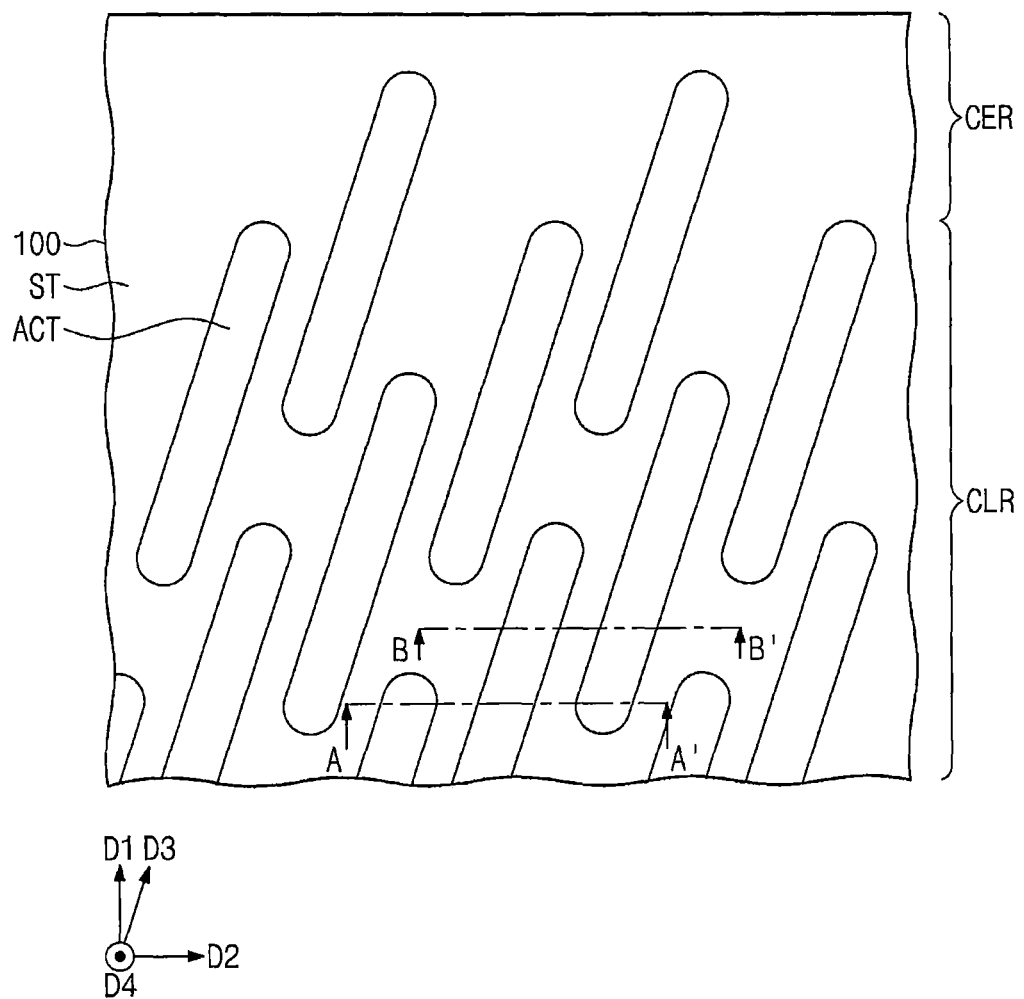
FIGS. 40, 42, 44, 46, 48, 50, and 52 illustrate plan views showing a method of fabricating a semiconductor device according to some example embodiments of the present inventive concepts.
Figure 41A:
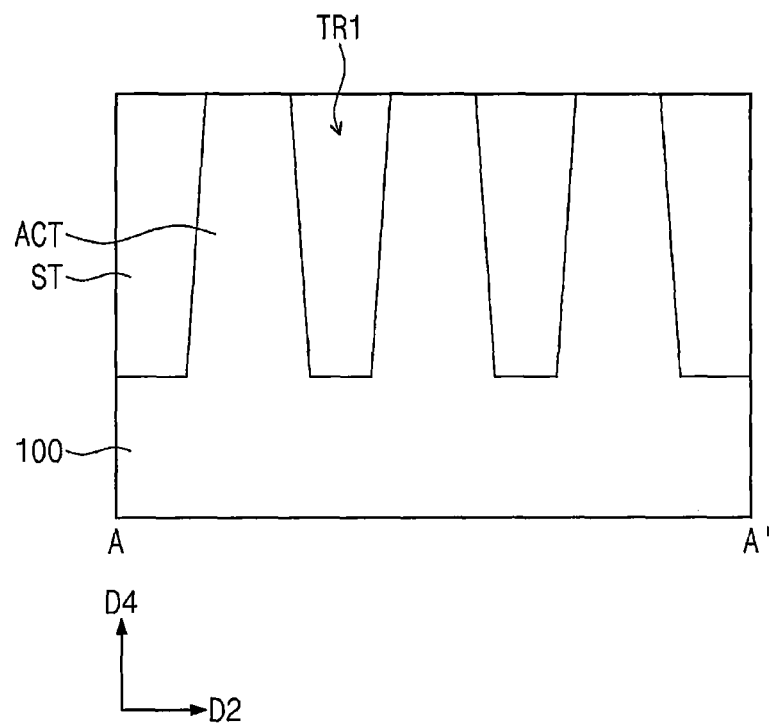
FIGS. 41A, 43A, 45A, 47A, 49A, 51A, and 53A illustrate cross-sectional views taken along line A-A' of FIGS. 40, 42, 44, 46, 48, 50, and 52, respectively.
Figure 41B:
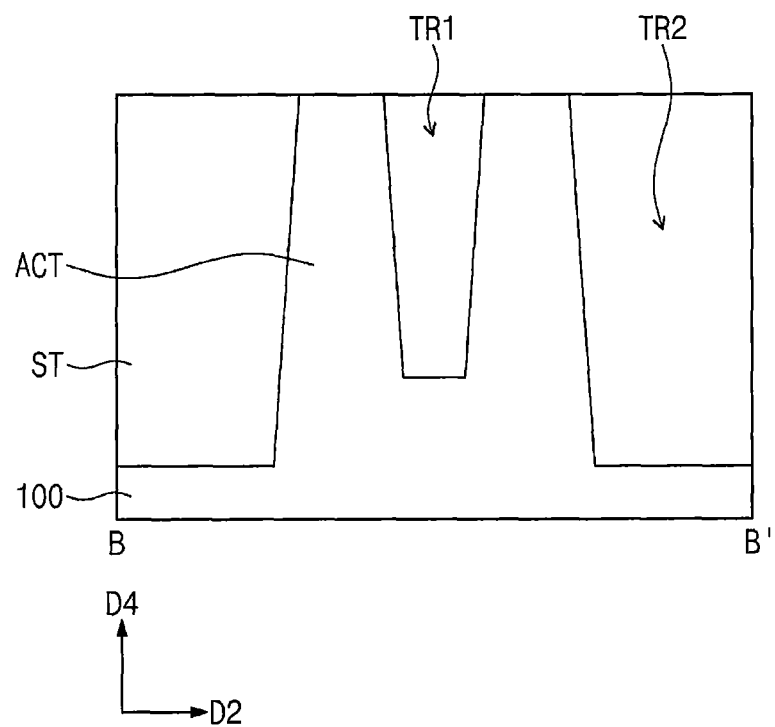
FIGS. 41B, 43B, 45B, 47B, 49B, 51B, and 53B illustrate cross-sectional views taken along line B-B' of FIGS. 40, 42, 44, 46, 48, 50, and 52, respectively.

Referring to FIGS. 40, 41A, and 41B, a substrate 100 may be provided which includes a cell region CLR and a cell edge region CER. The substrate 100 may be a semiconductor substrate including silicon, germanium, or silicon-germanium. The cell region CLR may be an area where effective memory cells are formed. The cell edge region CER may be an edge of the cell region CLR. The cell edge region CER may be an area between the cell region CLR and a peripheral circuit region (not shown) where peripheral circuits are disposed.

An upper portion of the substrate 100 may be patterned to form active patterns ACT. Each of the active patterns ACT may have a bar shape with a major axis (e.g., a longitudinal axis) in a third direction D3. The active patterns ACT may be spaced apart from each other in the third direction D3. Each of the active patterns ACT may have a width that decreases in a direction (e.g., a fourth direction D4) perpendicular to a top surface of the substrate 100. For example, the width of each of the active patterns ACT may decrease with increasing distance from a bottom surface of the substrate 100.

A photolithography process may form the active patterns ACT. For example, the formerly discussed OPC method according to the present inventive concepts may be applied to a layout that defines the active patterns ACT. As the active pattern ACT is a 2D pattern having a slant edge, the 3D filter approximation of FIGS. 9 and 31 may be applied to the layout that defines the active patterns ACT.

In the 3D filter approximation according to the present inventive concepts, a photomask may be prepared to perform an extreme ultraviolet (EUV) photolithography process such that exposure and development processes may each be executed only once to form the active patterns ACT that are inclined (or elongated in the third direction D3) and have a fine pitch.

First and second trenches TR1 and TR2 may be defined between the active patterns ACT. The first trench TR1 may be defined between a pair of active patterns ACT adjacent to each other in a second direction D2. The second trench TR2 may be defined between a pair of active patterns ACT adjacent to each other in the third direction D3.

A distance between the pair of active patterns ACT adjacent to each other in the second direction D2 may be less than a distance between the pair of active patterns ACT adjacent to each other in the third direction D3. Therefore, the second trench TR2 may have a depth from a top surface of the active pattern ACT greater than that of the first trench TR1. For example, the second trench TR2 may have a floor lower than that of the first trench TR1.

A device isolation layer ST may be formed to fill the first and second trenches TR1 and TR2. The device isolation layer ST may be formed to completely fill the first and second trenches TR1 and TR2 and to cover the active patterns ACT. The device isolation layer ST may include, for example, a silicon oxide layer. A planarization process may be performed on the device isolation layer ST until top surfaces of the active patterns ACT are exposed.

Figure 42:
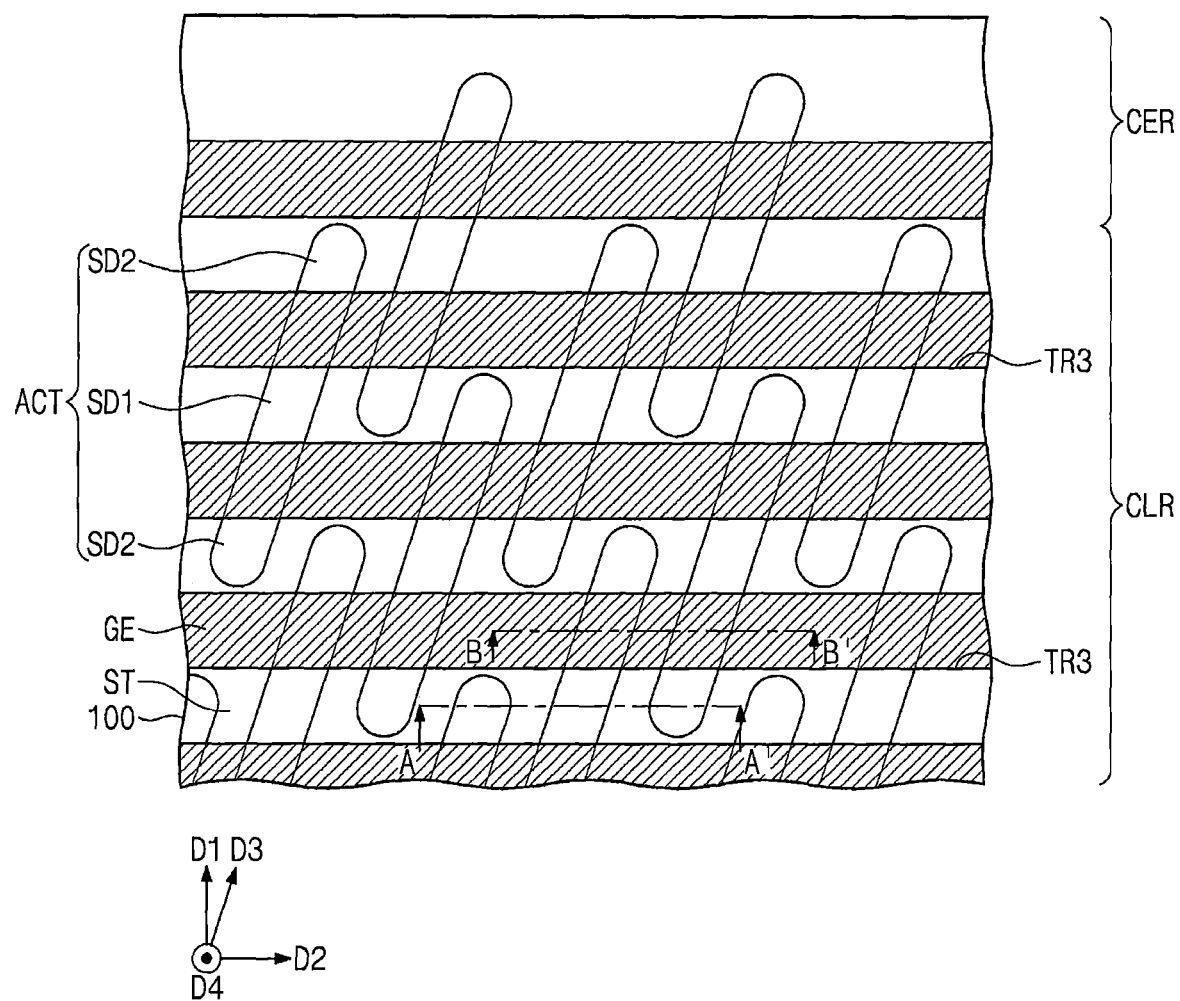
Figure 43A:
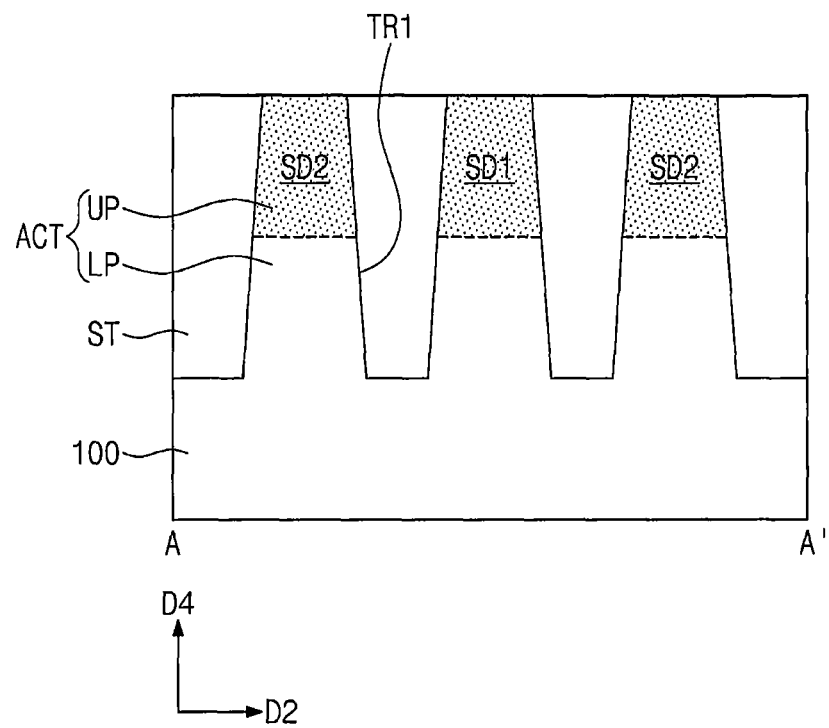
Figure 43B:
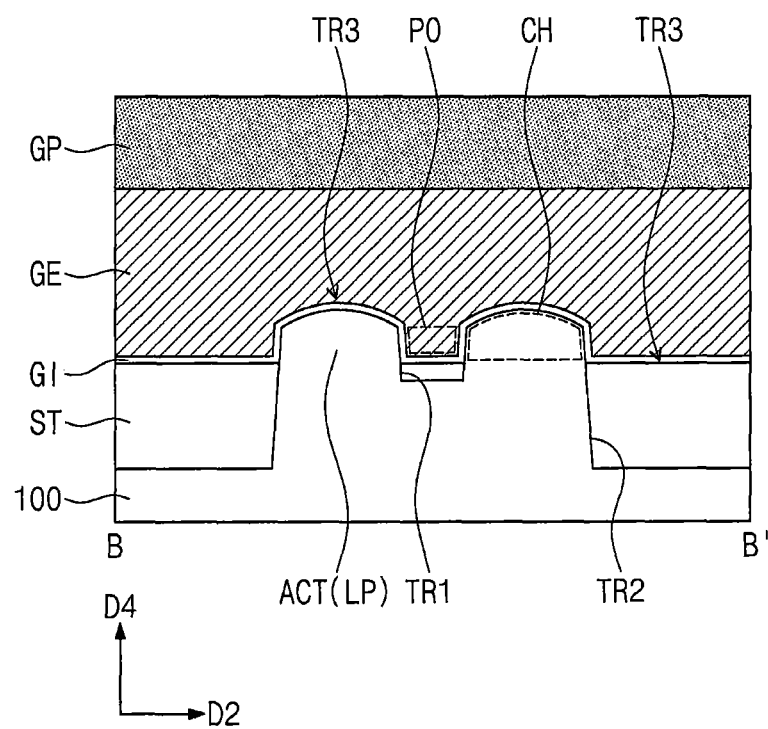

Referring to FIGS. 42, 43A, and 43B, the active patterns ACT and the device isolation layer ST may be patterned to form third trenches TR3. When viewed in plan, each of the third trenches TR3 may have a linear shape that intersects the active patterns ACT and extends in the second direction D2.

The formation of the third trenches TR3 may include forming a hardmask pattern that has openings, and then performing an etching process in which the hardmask pattern is used as an etching mask to etch the exposed active patterns ACT and the device isolation layer ST. The third trench TR3 may be formed shallower than the first trench TR1.

During the etching process, the device isolation layer ST may be etched more than the active patterns ACT (see FIG. 43B). An upper portion UP of each of the active patterns ACT in the third trench TR3 may vertically protrude beyond the device isolation layer ST. For example, the upper portion UP of the active pattern ACT in the third trench TR3 may have a fin shape. A lower portion LP of each of the active patterns ACT may be below the upper portion UP.

A gate dielectric layer GI, a gate electrode GE, and a gate capping layer GP may be formed in each of the third trenches TR3. For example, the gate dielectric layer GI may be conformally formed in the third trench TR3. The gate dielectric layer GI may include one or more of a silicon oxide layer, a silicon nitride layer, a silicon oxynitride layer, and a high-k dielectric material. For example, the high-k dielectric material may include hafnium oxide, hafnium silicon oxide, lanthanum oxide, zirconium oxide, zirconium silicon oxide, tantalum oxide, titanium oxide, barium strontium titanium oxide, barium titanium oxide, strontium titanium oxide, lithium oxide, aluminum oxide, lead scandium tantalum oxide, lead zinc niobate, or a combination thereof.

A conductive layer filling the third trench TR3 may be formed on the gate dielectric layer GI, thereby forming the gate electrode GE. The conductive layer may include one or more of conductive metal nitride (e.g., titanium nitride or tantalum nitride) and metal (e.g., titanium, tantalum, tungsten, copper, or aluminum).

The gate dielectric layer GI and the gate electrode GE may be recessed, and then the gate capping layer GP may be formed on the recessed gate electrode GE. The gate capping layer GP may have a top surface coplanar with that of the active pattern ACT. The gate capping layer GP may include one or more of a silicon oxide layer, a silicon nitride layer, and a silicon oxynitride layer.

The active patterns ACT may undergo an ion implantation process to form a first impurity region SD1 and a pair of second impurity regions SD2 on an upper portion UP of each of the active patterns ACT. The pair of second impurity regions SD2 may be spaced apart from each other in the third direction D3 across the first impurity region SD1. The first and second impurity regions SD1 and SD2 may be doped to have the same conductivity type (e.g., N-type).

Referring back to FIG. 43B, a channel region CH may be defined to indicate the active pattern ACT positioned under the gate electrode GE. When viewed in plan, the channel region CH may be interposed between the first impurity region SD1 and the second impurity region SD2. The gate electrode GE may be provided on a top surface and opposite sidewalls of the channel region CH. At least a portion PO of the gate electrode GE may be interposed between a pair of channel regions CH adjacent to each other in the second direction D2.

Figure 44:
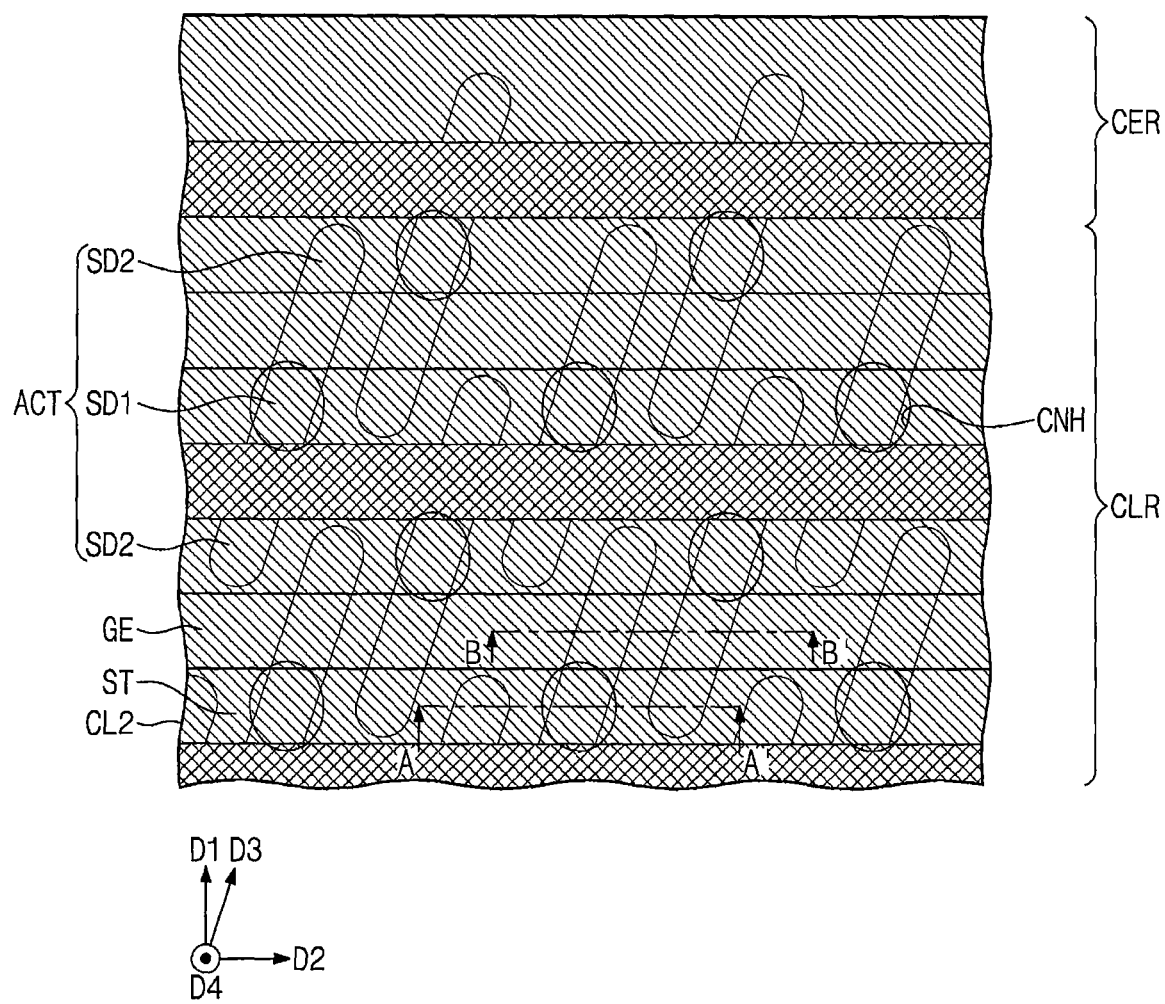
Figure 45A:
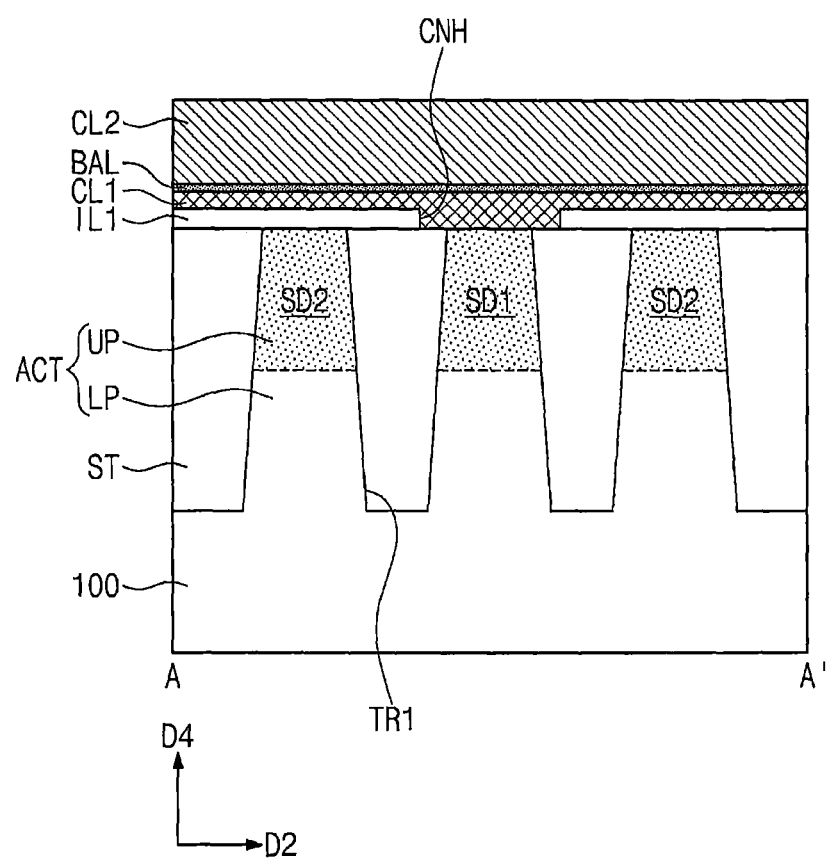
Figure 45B:
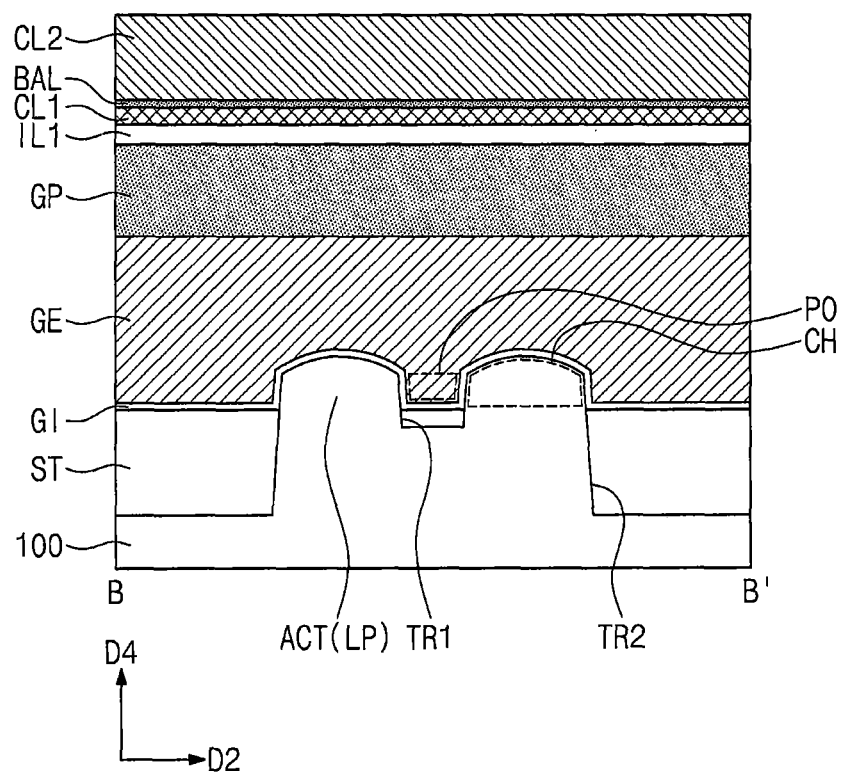

Referring to FIGS. 44, 45A, and 45B, a first interlayer dielectric layer IL1 may be formed on an entire surface of the substrate 100. For example, the first interlayer dielectric layer IL1 may include a silicon oxide layer. The first interlayer dielectric layer IL1 may be patterned to form contact holes CNH that correspondingly expose the first impurity regions SD1 of the active patterns ACT.

A first conductive layer CL1, a barrier layer BAL, and a second conductive layer CL2 may be sequentially formed on the first interlayer dielectric layer IL1. The first conductive layer CL1 may fill the contact holes CNH. For example, the first conductive layer CL1 may contact the first impurity regions SD1 of the active patterns ACT. The first interlayer dielectric layer IL1 may vertically separate the first conductive layer CL1 from the second impurity regions SD2 of the active patterns ACT.

The first conductive layer CL1 may include, for example, one of a doped semiconductor material (e.g., doped silicon or doped germanium), a metallic material (e.g., titanium, tantalum, tungsten, copper, or aluminum), and a metal-semiconductor compound (e.g., tungsten silicide, cobalt silicide, or titanium silicide).

The barrier layer BAL may be formed to lie between the first conductive layer CL1 and the second conductive layer CL2. The barrier layer BAL may include, for example, conductive metal nitride (e.g., titanium nitride or tantalum nitride). The second conductive layer CL2 may include a metallic material (e.g., titanium, tantalum, tungsten, copper, or aluminum). The barrier layer BAL may reduce and/or prevent a metallic material from diffusing toward the first conductive layer CL1 from the second conductive layer CL2.

Figure 46:
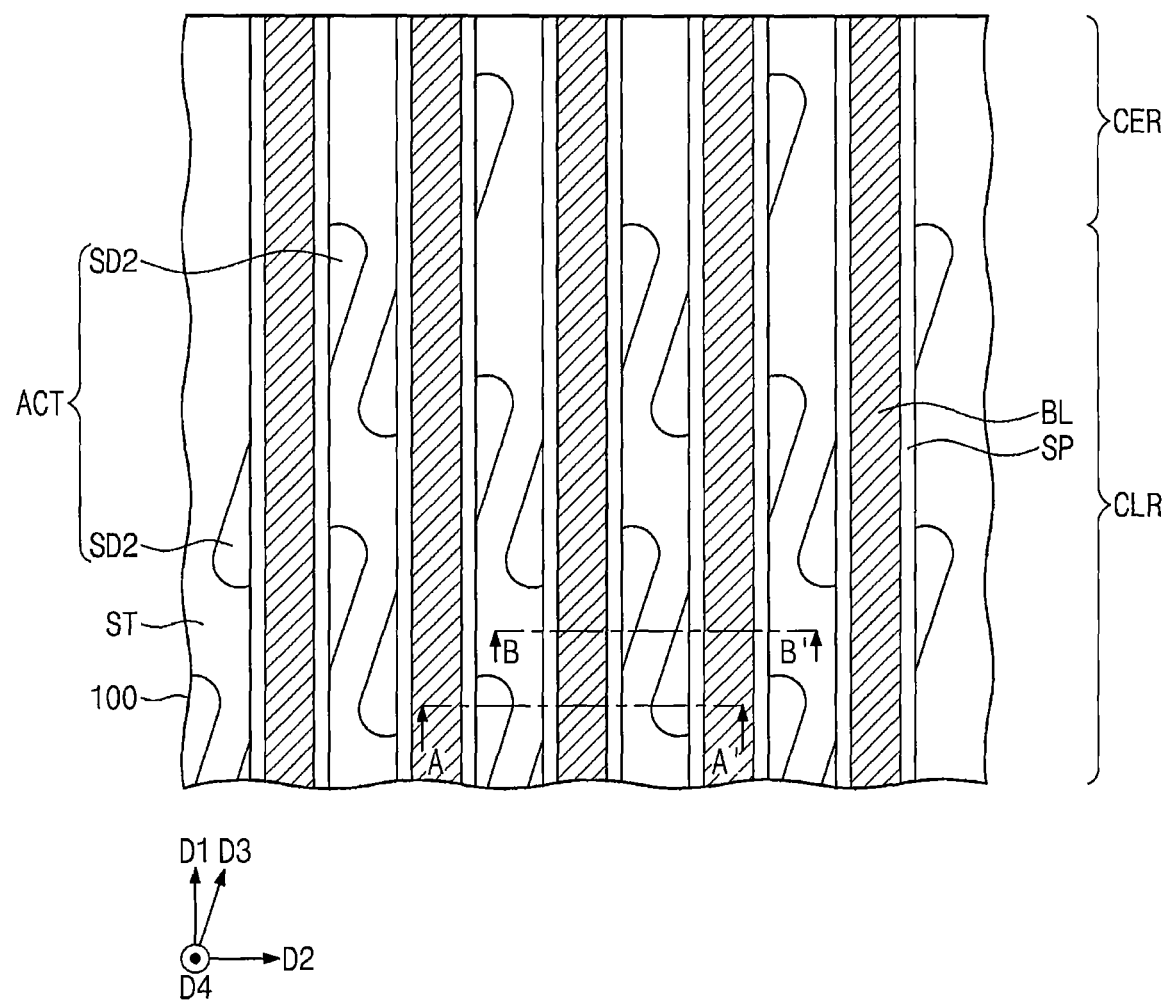
Figure 47A:
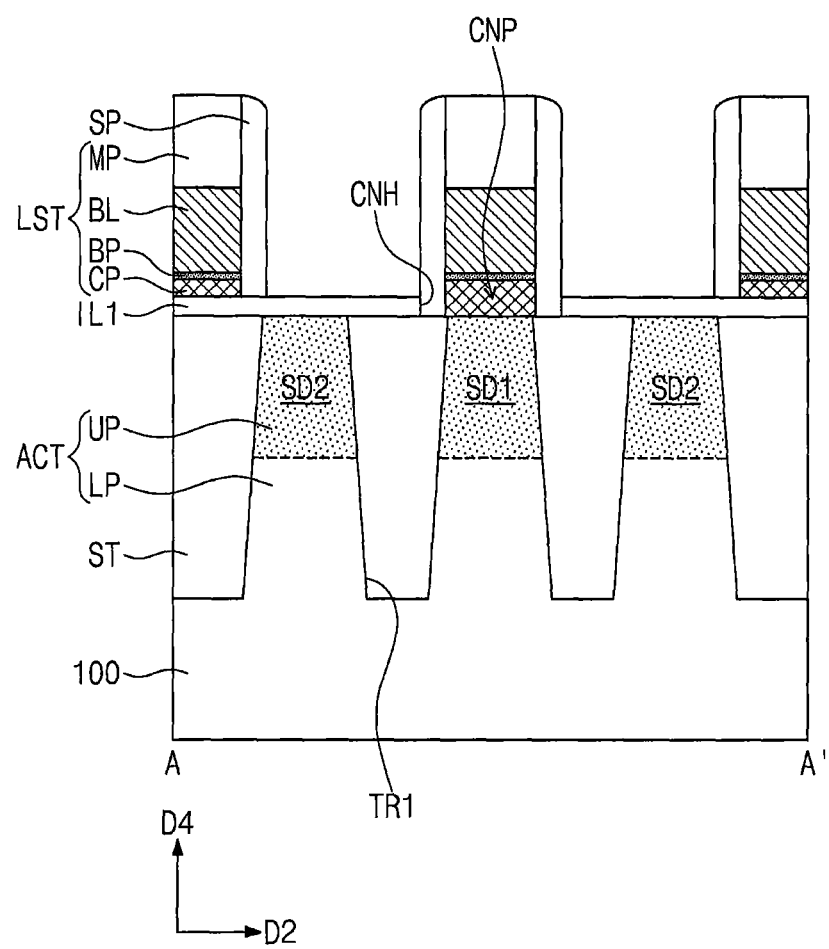
Figure 47B:
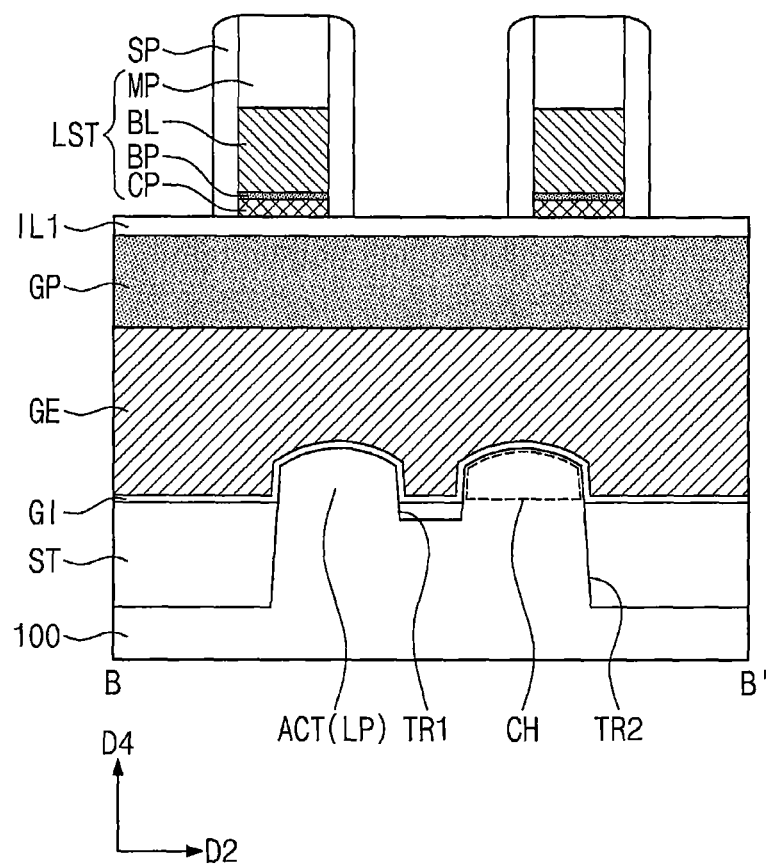

Referring to FIGS. 46, 47A, and 47B, mask patterns MP may be formed on the second conductive layer CL2. The mask patterns MP may be arranged along the second direction D2. Each of the mask patterns MP may be formed to have a linear shape that extends in a first direction D1. Each of the mask patterns MP may vertically overlap the contact holes CNH arranged in the first direction D1. For example, the mask patterns MP may include a silicon nitride layer or a silicon oxynitride layer. It will be understood that "an element A vertically overlapping an element B" (or similar language) as used herein means that at least one vertical line intersecting both the elements A and B exists.

The mask patterns MP may be used as an etching mask to sequentially etch the second conductive layer CL2, the barrier layer BAL, and the first conductive layer CL1 to respectively form a bit line BL, a barrier pattern BP, and a conductive pattern CP. The mask pattern MP, the bit line BL, the barrier pattern BP, and the conductive pattern CP may vertically overlap each other. The mask pattern MP, the bit line BL, the barrier pattern BP, and the conductive pattern CP may constitute a line structure LST. When viewed in plan, the bit line BL may extend in the first direction D1 while intersecting the gate electrodes GE.

The conductive pattern CP may include contact parts CNP that fill the contact holes CNH. The conductive pattern CP may be connected through the contact part CNP to the first impurity region SD1. For example, the bit line BL may be electrically connected through the conductive pattern CP to the first impurity region SD1.

A pair of spacers SP may be formed on opposite sidewalls of each of the line structures LST. The formation of the spacers SP may include conformally forming a spacer layer on the entire surface of the substrate 100 and then anisotropically etching the spacer layer. The spacer layer may include, for example, one or more of a silicon oxide layer, a silicon nitride layer, and a silicon oxynitride layer.

Figure 48:
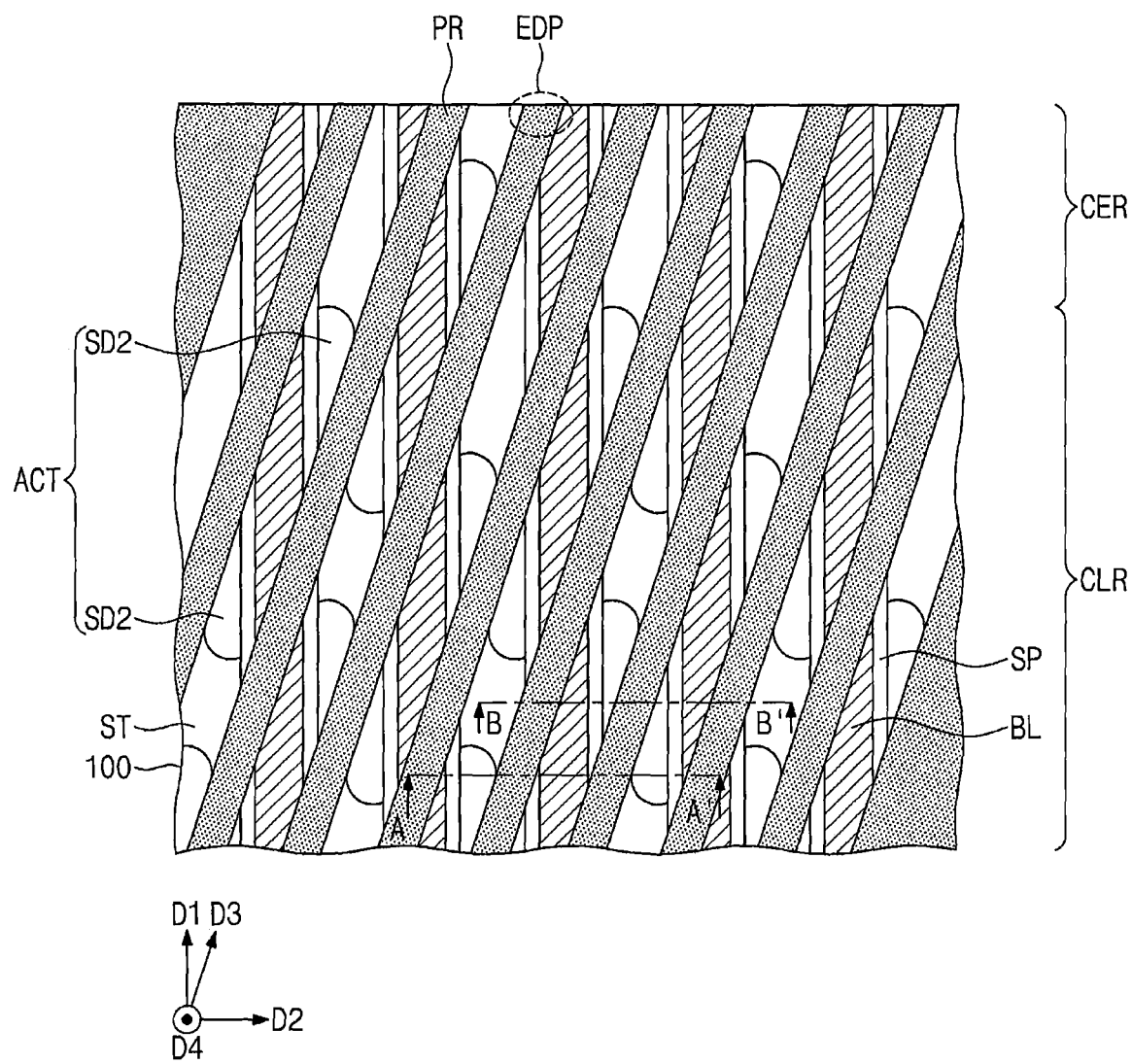
Figure 49A:
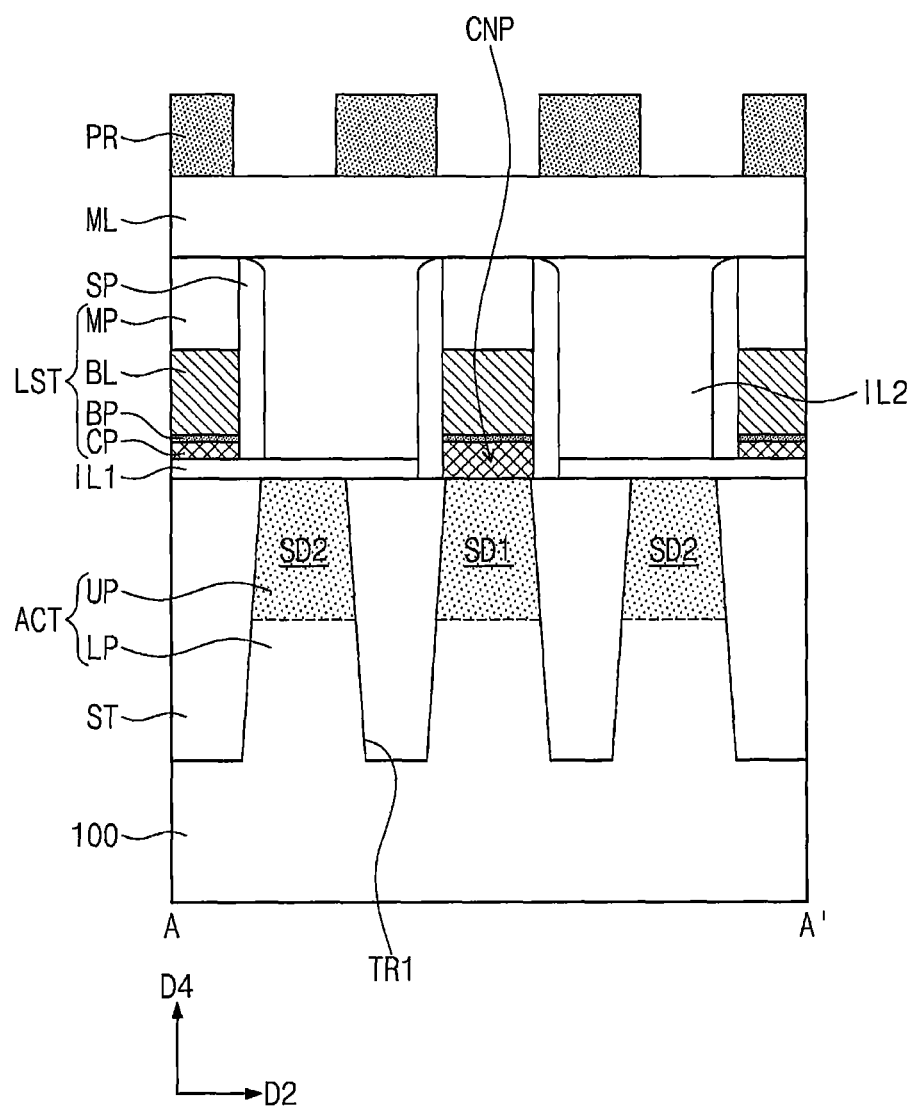
Figure 49B:
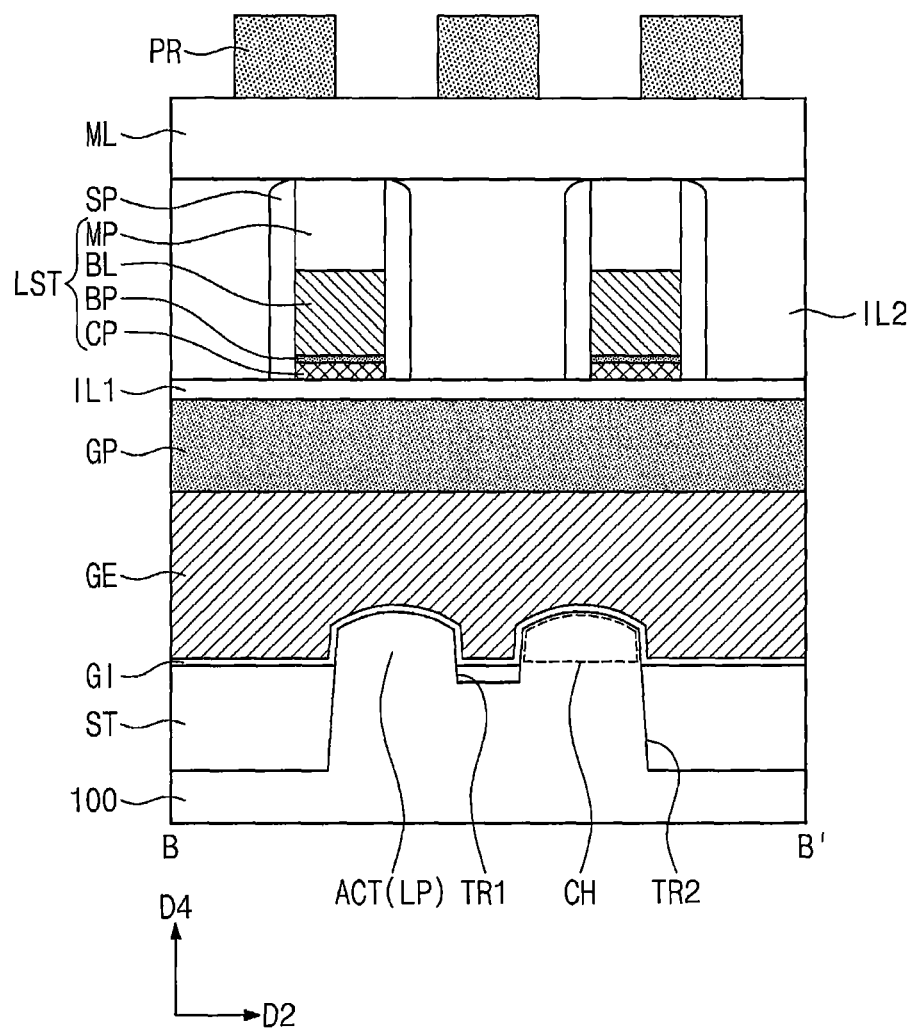

Referring to FIGS. 48, 49A, and 49B, a second interlayer dielectric layer IL2 may be formed on the substrate 100. For example, the second interlayer dielectric layer IL2 may include a silicon oxide layer. A planarization process may be performed on the second interlayer dielectric layer IL2 until top surfaces of the mask patterns MP are exposed.

A mask layer ML may be formed on the second interlayer dielectric layer IL2. Photoresist patterns PR may be formed on the mask layer ML. Each of the photoresist patterns PR may have a linear shape that extends in the third direction D3. The photoresist pattern PR may extend from the cell region CLR to the cell edge region CER. When viewed in plan, the photoresist pattern PR may be interposed between and elongated parallel to neighboring active patterns ACT.

Referring back to FIG. 48, an edge part EDP may be included in one end of the photoresist pattern PR on the cell edge region CER. In a photoresist process to form the photoresist patterns PR according to some example embodiments, the optical proximity correction method discussed above may be used to fabricate a photomask. The edge part EDP of the photoresist pattern PR may be a 2D pattern having an arbitrary shape, and thus the 3D filter approximation discussed above may be applied thereto.

In the 3D filter approximation according to the present inventive concepts, a photomask may be prepared to perform an extreme ultraviolet (EUV) photolithography process such that exposure and development processes may each be executed only once to form the photoresist patterns PR that are inclined (or elongated in the third direction D3) and have a fine pitch.

Figure 50:
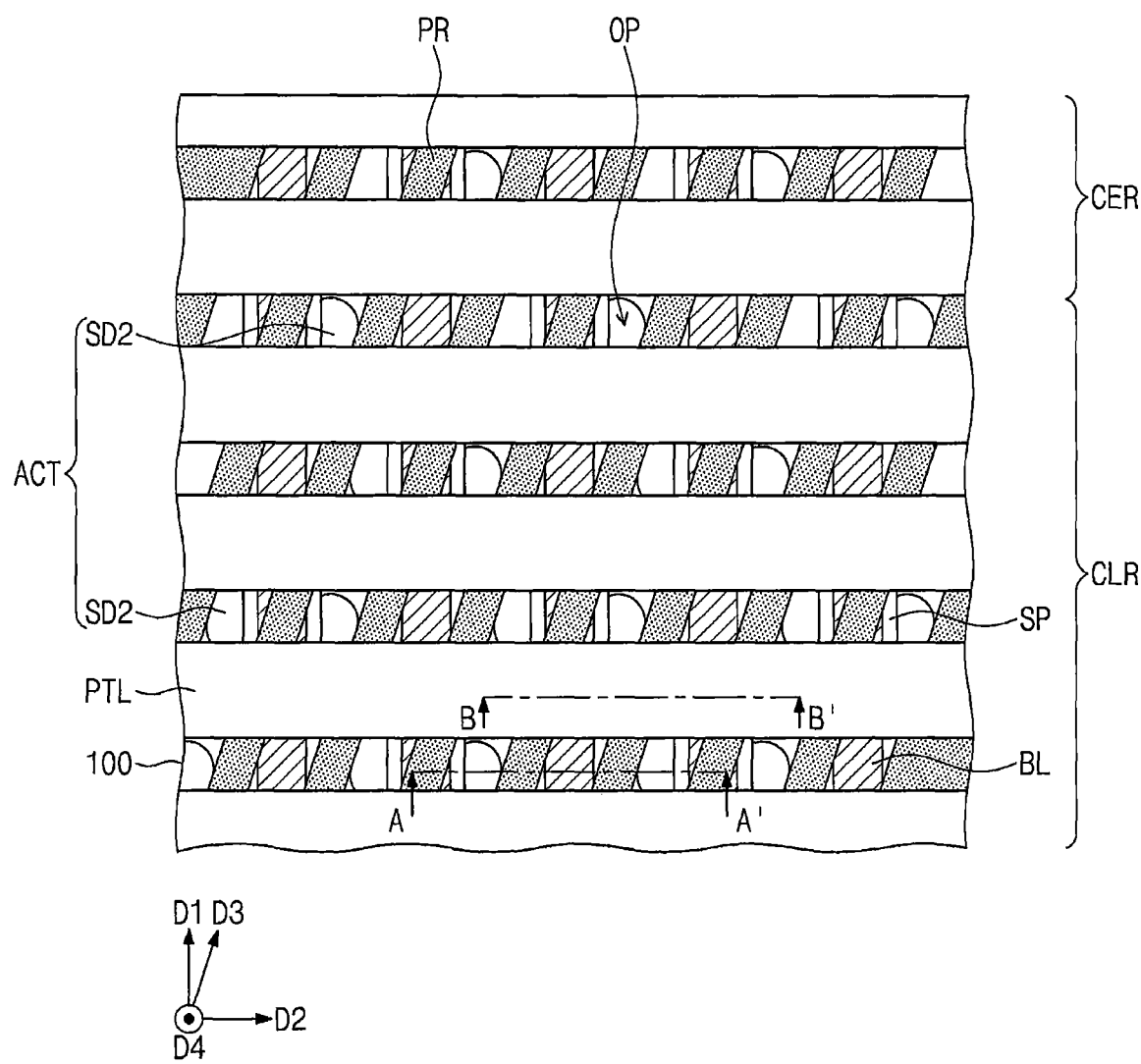
Figure 51A:
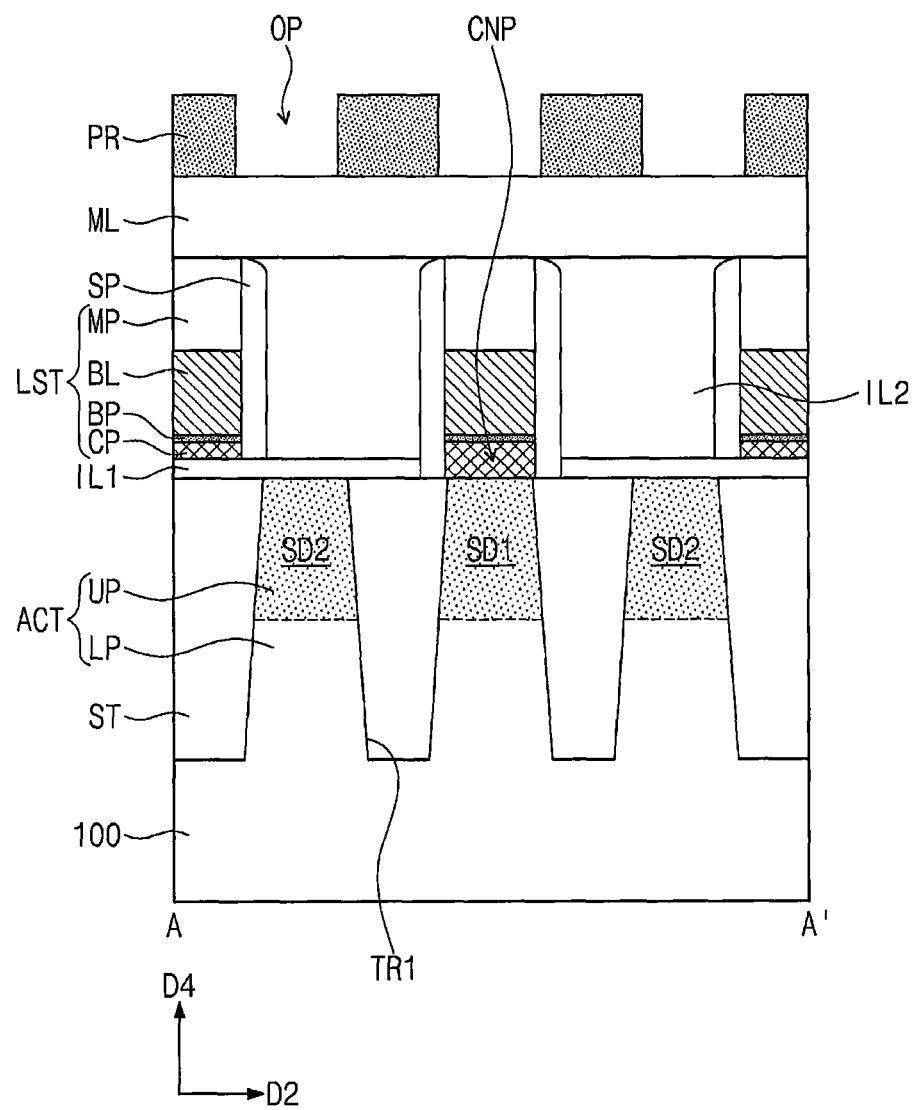
Figure 51B:
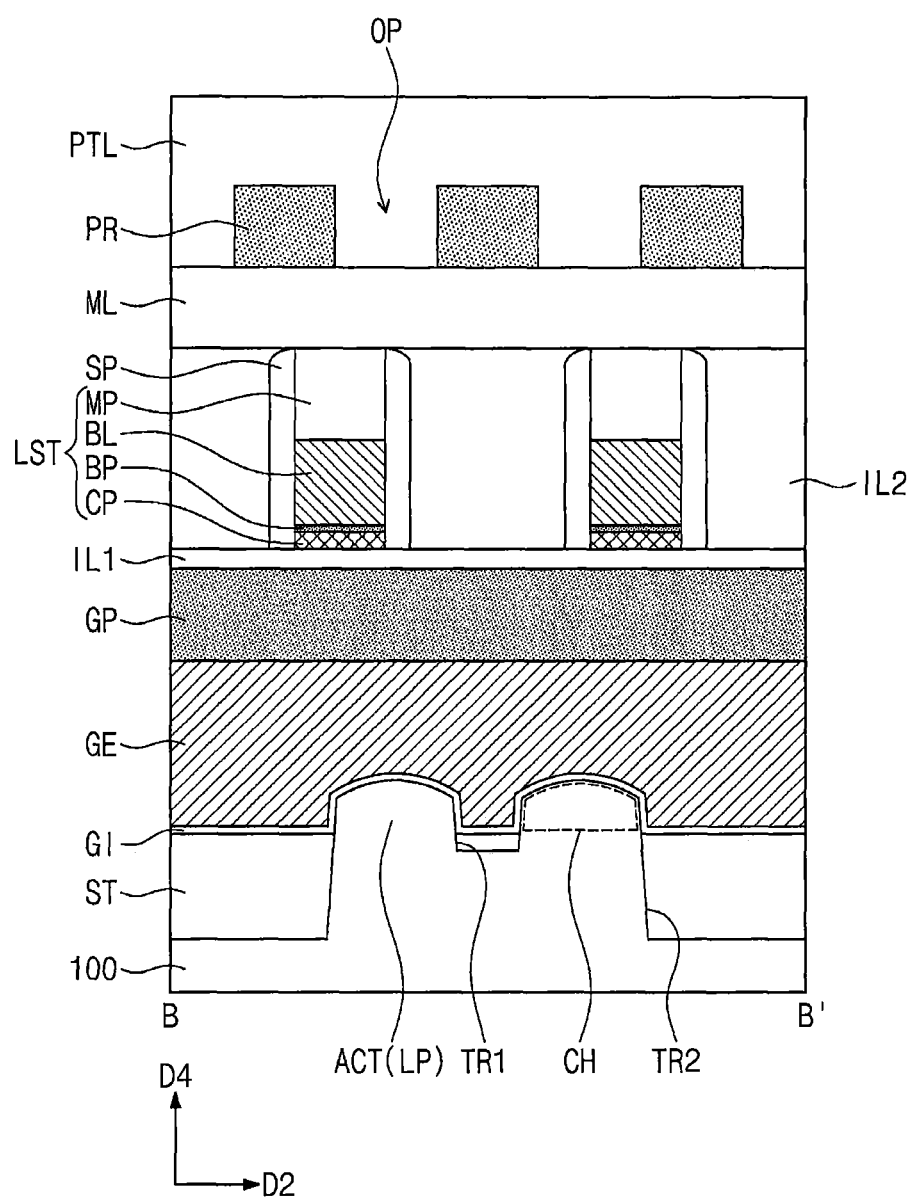

Referring to FIGS. 50, 51A, and 51B, protective patterns PTL may be formed on the photoresist patterns PR. Each of the protective patterns PTL may have a linear shape that extends in the second direction D2. When viewed in plan, the protective patterns PTL and the photoresist patterns PR may cross each other to form a grid structure. Openings OP may be defined between the protective patterns PTL and the photoresist patterns PR. Each of the openings OP may vertically overlap the second impurity region SD2 of the active pattern ACT.

Figure 52:
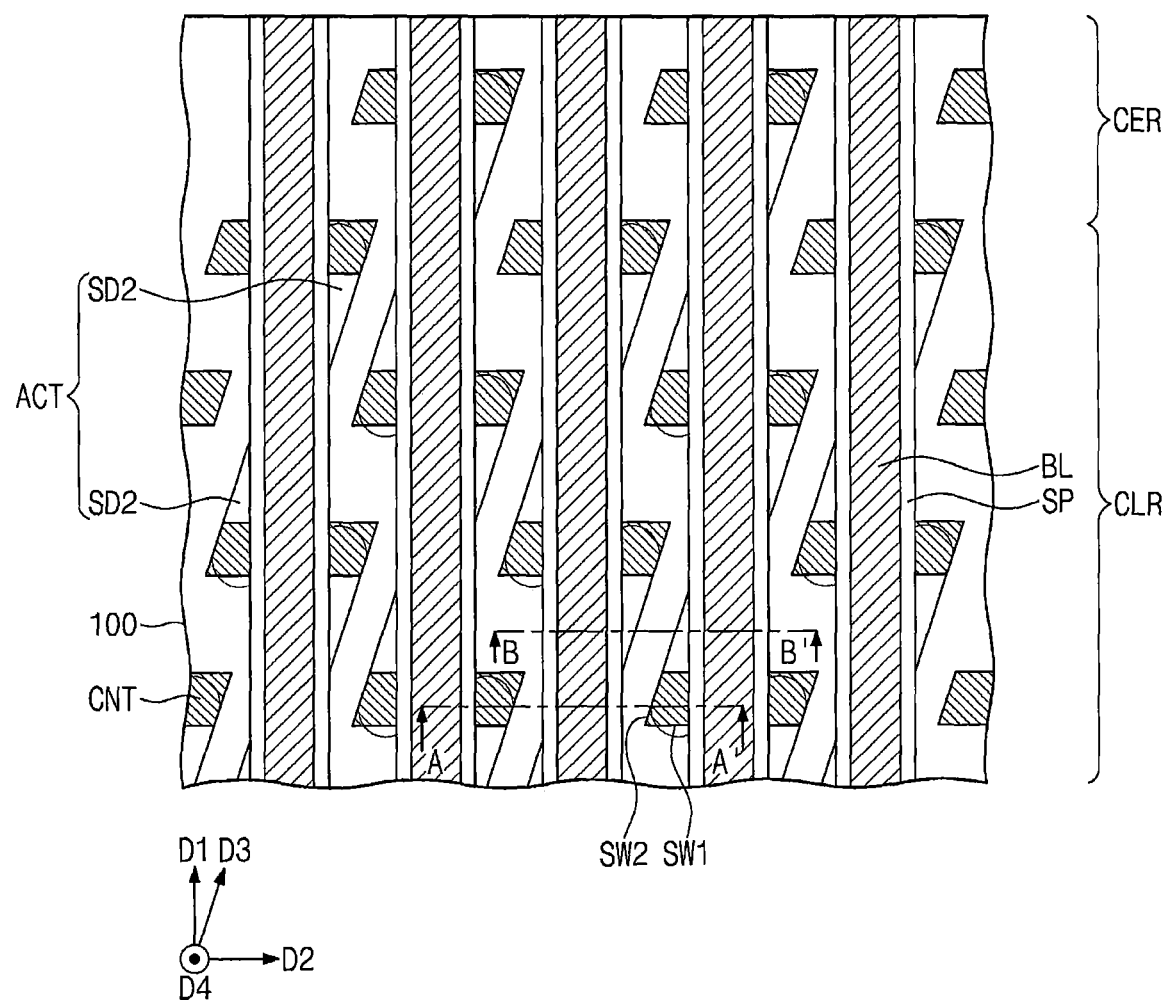
Figure 53A:
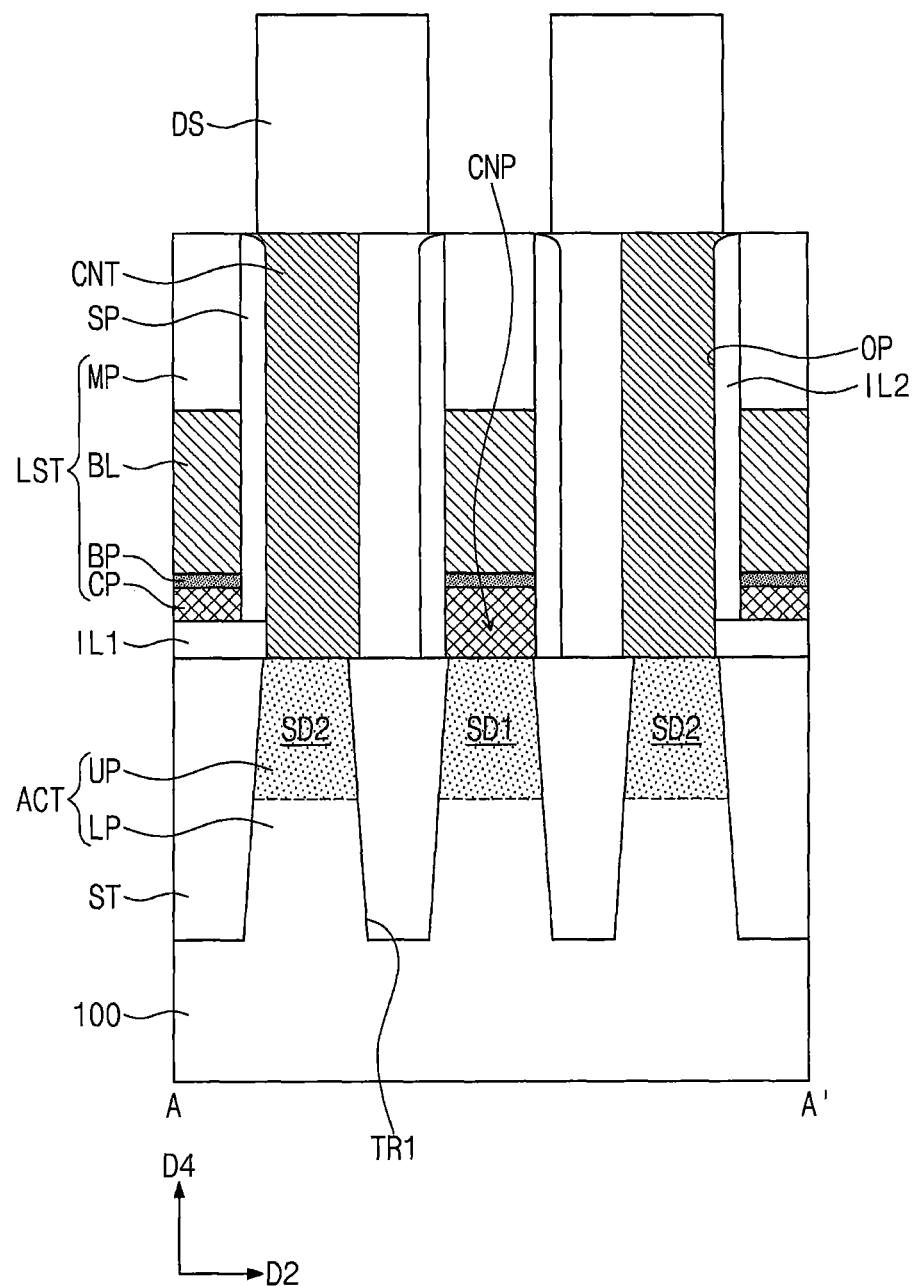
Figure 53B:
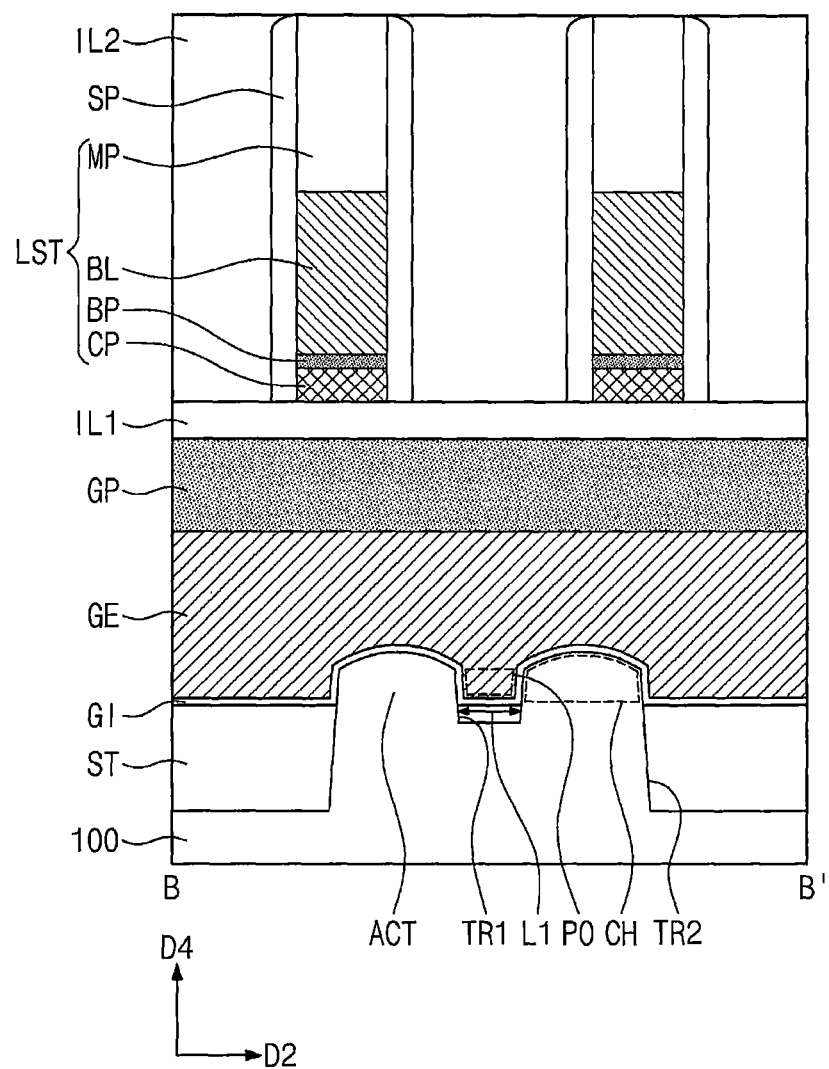

Referring to FIGS. 52, 53A, and 53B, an anisotropic etching process may be performed in which the photoresist patterns PR and the protective patterns PTL are used as an etching mask to pattern the second interlayer dielectric layer IL2 and the first interlayer dielectric layer IL1. For example, the opening OP may penetrate the second and first interlayer dielectric layers IL2 and IL1 to thereby expose the second impurity region SD2.

During the anisotropic etching process, as the mask patterns MP and the spacers SP are used as an etching mask, the openings OP exposing the second impurity regions SD2 may be formed in self-alignment.

The openings OP may be filled with a conductive material to form contacts CNT. The conductive material may include one or more of conductive metal nitride (e.g., titanium nitride or tantalum nitride) and metal (e.g., titanium, tantalum, tungsten, copper, or aluminum). The contacts CNT may be correspondingly connected to the second impurity regions SD2. The spacers SP may separate the contacts CNT from the bit lines BL.

Referring back to FIG. 52, when viewed in plan, each of the contacts CNT may have a first sidewall SW1 parallel to the second direction D2 and a second sidewall SW2 parallel to the third direction D3. The first sidewall SW1 and the second sidewall SW2 may meet each other to define a corner having an acute angle. For example, each of the contacts CNT may have a rhombic shape.

A data storage element DS may be formed on each of the contacts CNT. The data storage element DS may be a memory element using one of a capacitor, a magnetic tunnel junction pattern, and a variable resistance body that includes a phase change material. For example, the data storage element DS may be a capacitor.

An optical proximity correction (OPC) method according to the present inventive concepts may use a compact simulation model (or 3D filter approximation) to promptly generate an optical image of a designed layout. Moreover, the 3D filter approximation may be applied by performing a manhattanization procedure on a pattern including a corner with any angle. In conclusion, the present inventive concepts may provide an OPC model with high accuracy and promptness.

Although some example embodiments of the present inventive concepts have been discussed with reference to accompanying figures, it will be understood that various changes in form and details may be made therein without departing from the scope of the present inventive concepts. It therefore will be understood that the embodiments described above are just illustrative but not limitative in all aspects.

What is claimed is:

1. A method of fabricating a semiconductor device, the method comprising:
   performing an optical proximity correction (OPC) on a layout of a pattern to generate a corrected layout of the pattern; and
   forming a photoresist pattern on a substrate by using a photomask fabricated with the corrected layout of the pattern,
   wherein performing the OPC comprises:

extracting edges of the layout of the pattern, the edges comprising a first edge and a second edge that define a corner having an angle between the first and second edges;

defining a bisector that bisects the angle between the first and second edges;

changing the first edge and the second edge into a first stepped edge and a second stepped edge on opposite sides of the bisector; and generating an optical image comprising the corrected layout of the pattern by applying a three-dimensional (3D) filter to the first and second stepped edges.

2. The method of claim 1, wherein each of the first and second stepped edges comprises:

a first fine edge parallel to the bisector; and a second fine edge perpendicular to the bisector, and wherein the 3D filter is applied to the first and second fine edges.

3. The method of claim 2, wherein the first stepped edge comprises a plurality of first fine edges alternately arranged with a plurality of second fine edges, and wherein the second stepped edge comprises a plurality of first fine edges alternately arranged with a plurality of second fine edges.

4. The method of claim 2, further comprising applying a coupling filter to the first fine edge of the first stepped edge and to the first fine edge of the second stepped edge, wherein the coupling filter is configured to adjust for a coupling effect between the first fine edge and the second fine edge caused by a width of the pattern.

5. The method of claim 2, wherein the 3D filter applied to the first and second fine edges comprises at least one selected from an edge filter, an any-angle filter, and a coupling filter.

6. The method of claim 1, wherein the first stepped edge and the second stepped edge are symmetrical with each other about the bisector.

7. The method of claim 1, wherein the angle is an acute angle.

8. The method of claim 1, wherein the optical image is generated by applying the 3D filter to a thin mask image obtained by a thin mask approximation.

9. The method of claim 1, further comprising:

after generating the optical image, generating an OPC model based on the optical image; and performing a simulation using the OPC model to obtain design data about the photomask.

10. The method of claim 1, wherein forming the photoresist pattern comprises performing an extreme ultraviolet (EUV) lithography.

11. The method of claim 1, further comprising:

forming an active pattern on the substrate;

forming a gate electrode on the active pattern;

forming a bit line on a first source/drain region of the active pattern adjacent to a first side of the gate electrode;

forming a contact on a second source/drain region of the active pattern adjacent to a second side of the gate electrode; and forming a data storage element on the contact, wherein the photoresist pattern defines an opening for forming the contact.

12. A method of fabricating a semiconductor device, the method comprising:

providing a layout of a pattern;

performing an optical proximity correction (OPC) on the layout to generate a corrected layout of the pattern; and forming a photoresist pattern on a substrate by using a photomask fabricated with the corrected layout, wherein performing the OPC comprises:

extracting edges of the pattern, the edges comprising a first edge and a second edge that converge to define a corner;

generating a thin mask image by applying a thin mask approximation to the pattern;

changing the first edge and the second edge into a first stepped edge and a second stepped edge; and applying a three-dimensional (3D) filter to the first and second stepped edges to generate an optical image comprising the corrected layout of the pattern to which the 3D filter is applied from the thin mask image.

13. The method of claim 12, wherein generating the optical image comprises applying the 3D filter to extracted edges of the pattern other than the first and second stepped edges.

14. The method of claim 12, further comprising defining a bisector between the first and second edges, wherein the first and second stepped edges are generated through a manhattanization procedure performed around the bisector.

15. The method of claim 12, further comprising:

after generating the optical image, generating an OPC model based on the optical image; and performing a simulation using the OPC model to obtain design data about the photomask.

16. The method of claim 12, wherein forming the photoresist pattern comprises performing an extreme ultraviolet (EUV) lithography.

17. A method of fabricating a semiconductor device, the method comprising:

forming on a substrate an active pattern that has a longitudinal axis in a first direction;

forming a trench that penetrates an upper portion of the active pattern and extends in a second direction;

forming a gate electrode in the trench;

forming in the upper portion of the active pattern a first source/drain region and a second source/drain region that are respectively adjacent to opposite sides of the gate electrode;

forming a bit line on the active pattern and extending in a third direction, the bit line being coupled to the first source/drain region, and the third direction intersecting the second direction;

forming an interlayer dielectric layer on the bit line;

forming on the interlayer dielectric layer a plurality of photoresist patterns that extend in the first direction, wherein an opening between the photoresist patterns vertically overlaps the second source/drain region, and wherein each of the photoresist patterns comprises an edge part having a corner;

using the photoresist patterns as a mask to anisotropically etch the interlayer dielectric layer to expose the second source/drain region through the opening;

forming in the opening a contact coupled to the second source/drain region; and forming a data storage element on the contact, wherein forming the photoresist patterns includes performing an optical proximity correction (OPC) on a layout that defines the photoresist patterns, wherein performing the OPC comprises:

extracting a first edge and a second edge in the layout that define the corner of the edge part;

defining a bisector between the first and second edges;

changing the first edge and the second edge into a first stepped edge and a second stepped edge that are across the bisector; and generating an optical image by applying a three-dimensional (3D) filter to the first and second stepped edges.

18. The method of claim 17, further comprising:

after generating the optical image, generating an OPC model based on the optical image; and performing a simulation using the OPC model to obtain design data about a photomask.

19. The method of claim 17, wherein forming the plurality of photoresist patterns comprises performing an extreme ultraviolet (EUV) lithography.

20. The method of claim 17, wherein the optical image is generated by applying the 3D filter to a thin mask image obtained by a thin mask approximation.

* * * * *